May 9, 1944.  C. J. GOODALE  2,348,535
ACCOUNTING APPARATUS
Filed Feb. 9, 1939  12 Sheets-Sheet 2

INVENTOR
Charles J. Goodale.
BY
ATTORNEY

May 9, 1944.  C. J. GOODALE  2,348,535
ACCOUNTING APPARATUS
Filed Feb. 9, 1939   12 Sheets-Sheet 4
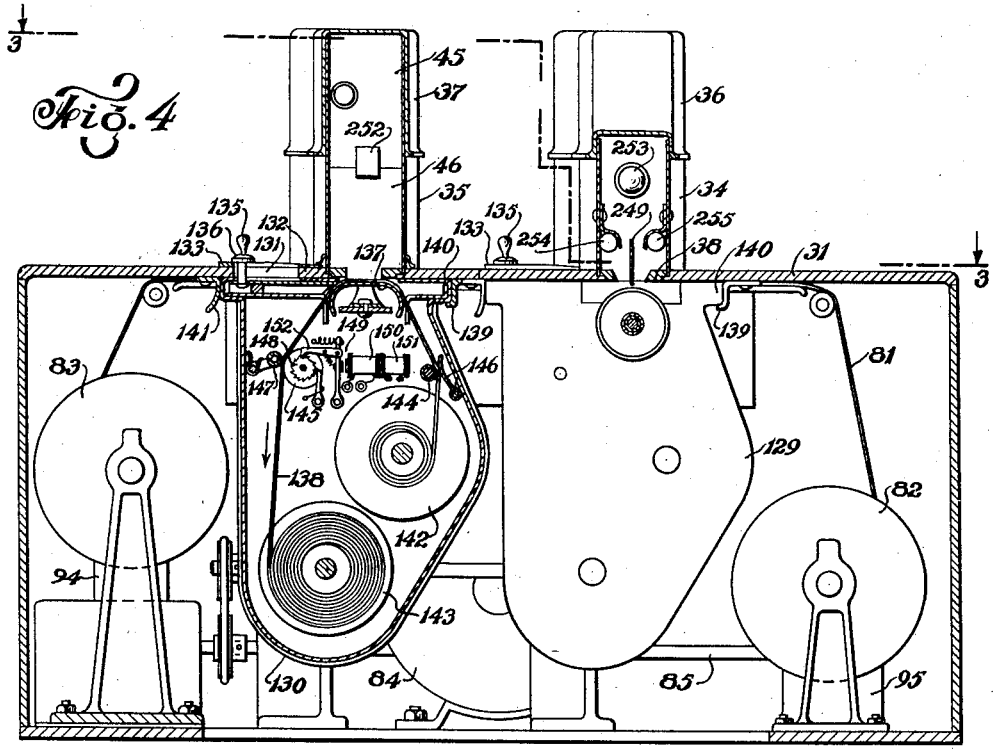
Fig. 4
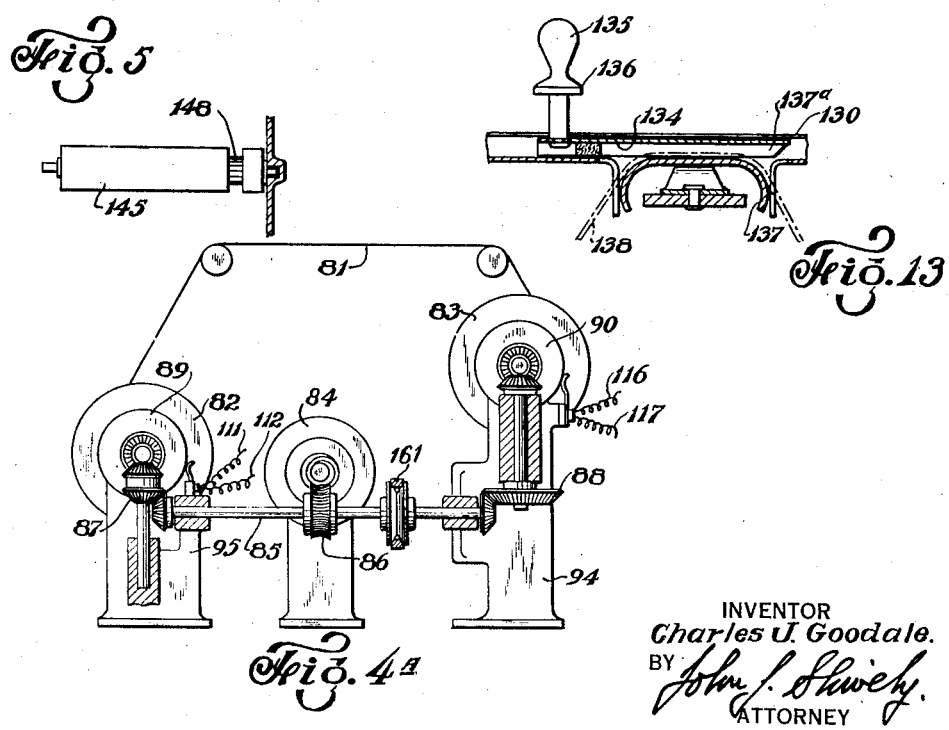
Fig. 5
Fig. 13
Fig. 4A
INVENTOR
Charles J. Goodale.
BY
ATTORNEY May 9, 1944.    C. J. GOODALE    2,348,535
ACCOUNTING APPARATUS
Filed Feb. 9, 1939    12 Sheets-Sheet 5
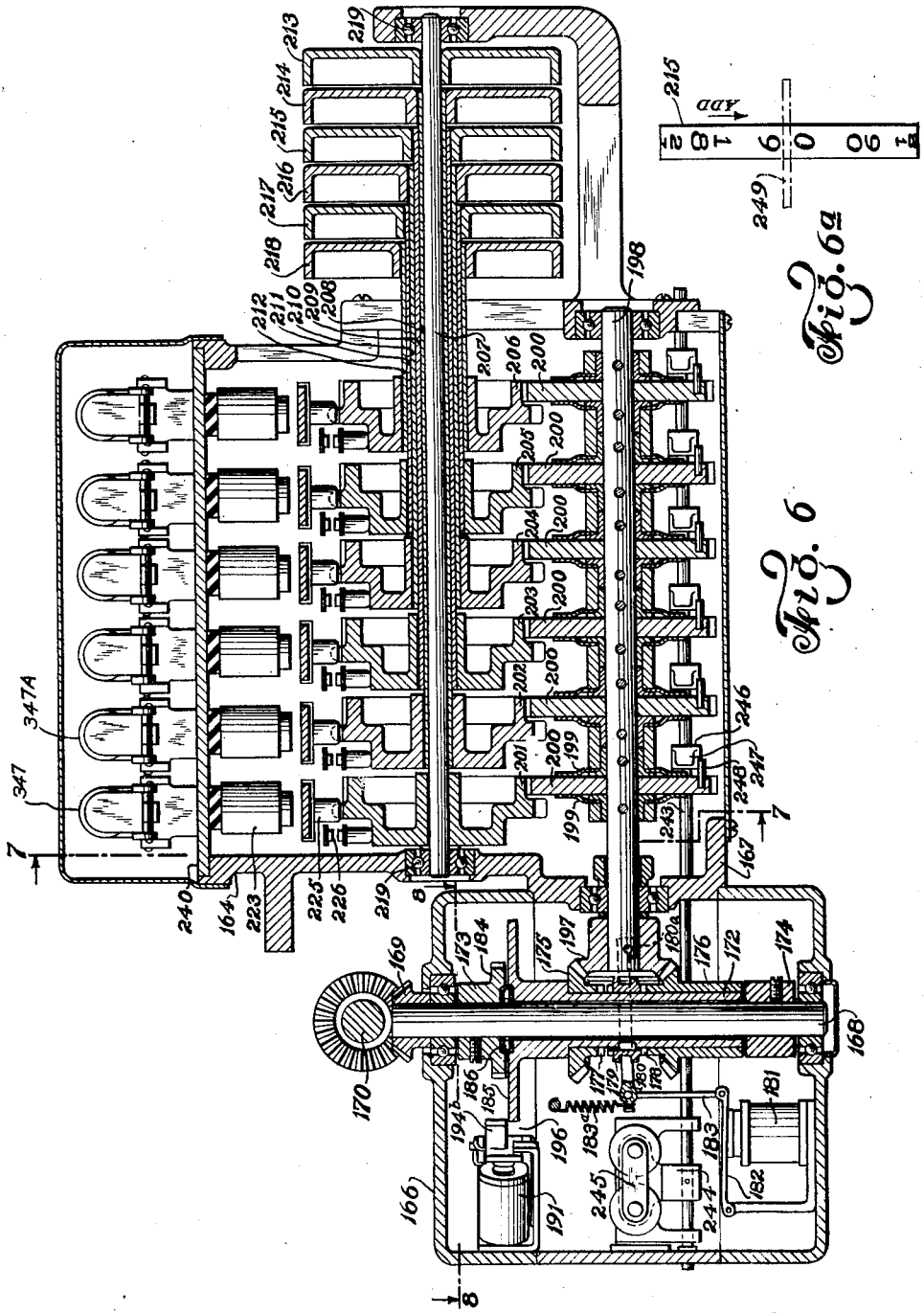
INVENTOR
Charles J. Goodale.
BY
ATTORNEY May 9, 1944. C. J. GOODALE 2,348,535
ACCOUNTING APPARATUS
Filed Feb. 9, 1939 12 Sheets-Sheet 6
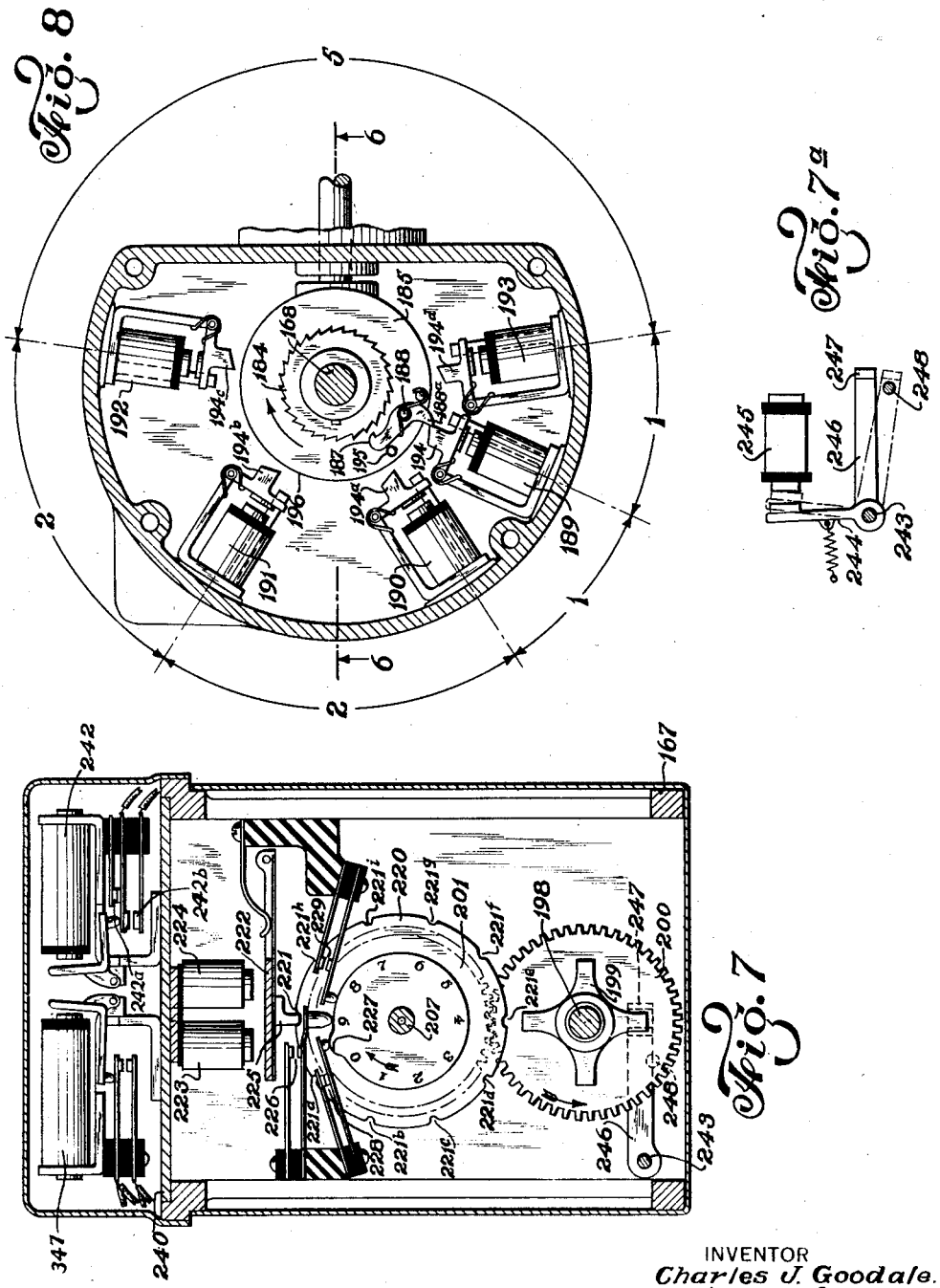
INVENTOR
Charles J. Goodale.
BY
ATTORNEY May 9, 1944.  C. J. GOODALE  2,348,535
ACCOUNTING APPARATUS
Filed Feb. 9, 1939  12 Sheets-Sheet 7
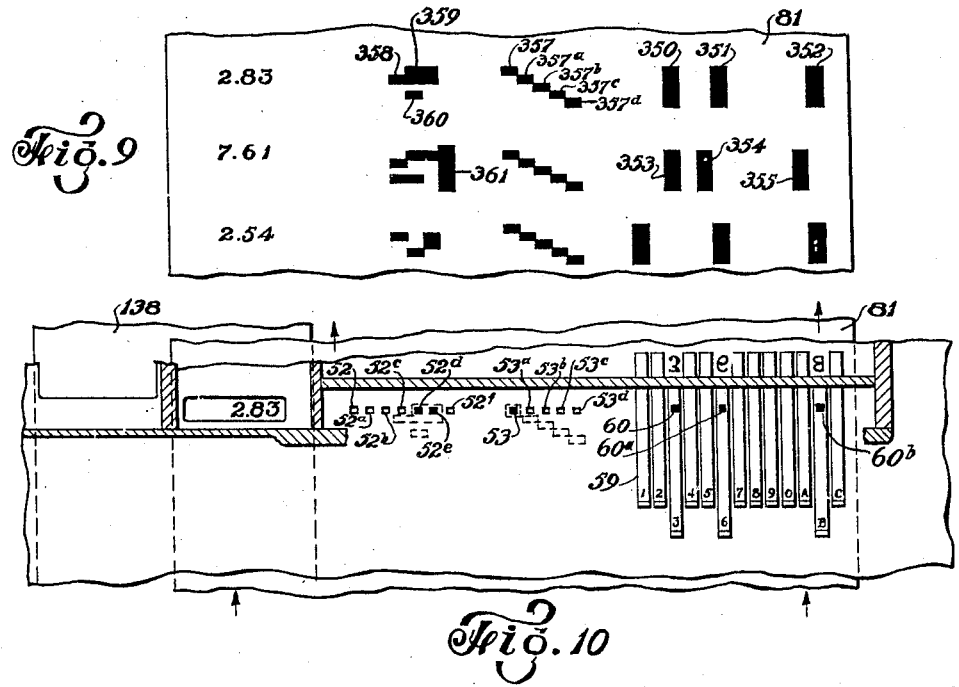
Fig. 9
Fig. 10
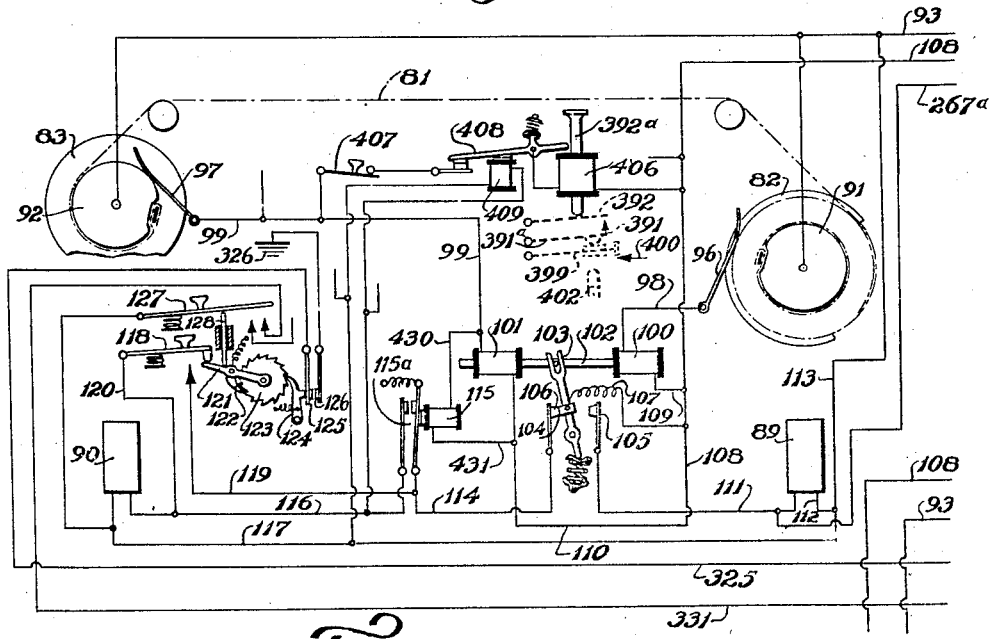
Fig. 12
INVENTOR
Charles J. Goodale
BY
John J. Shively
ATTORNEY

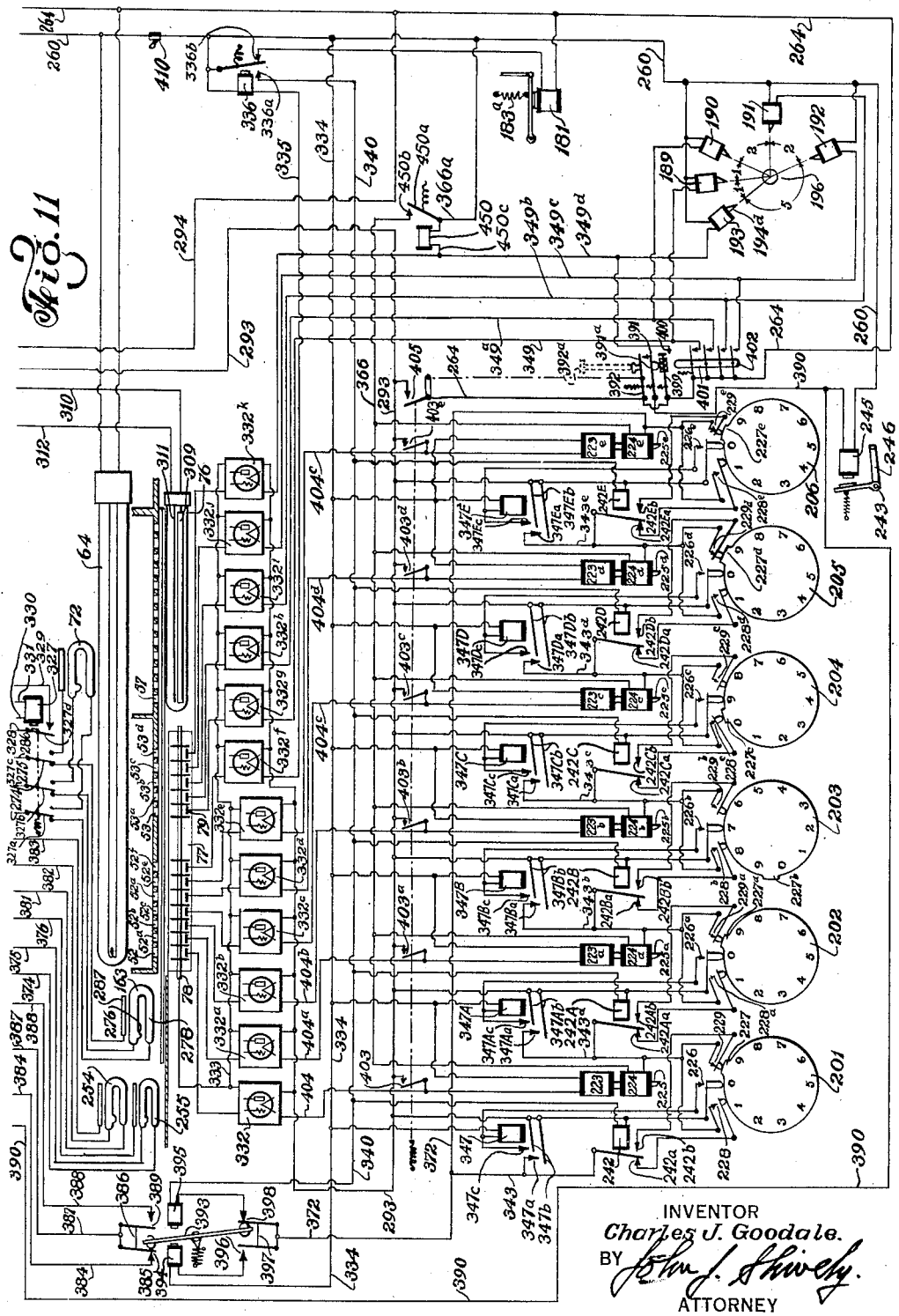

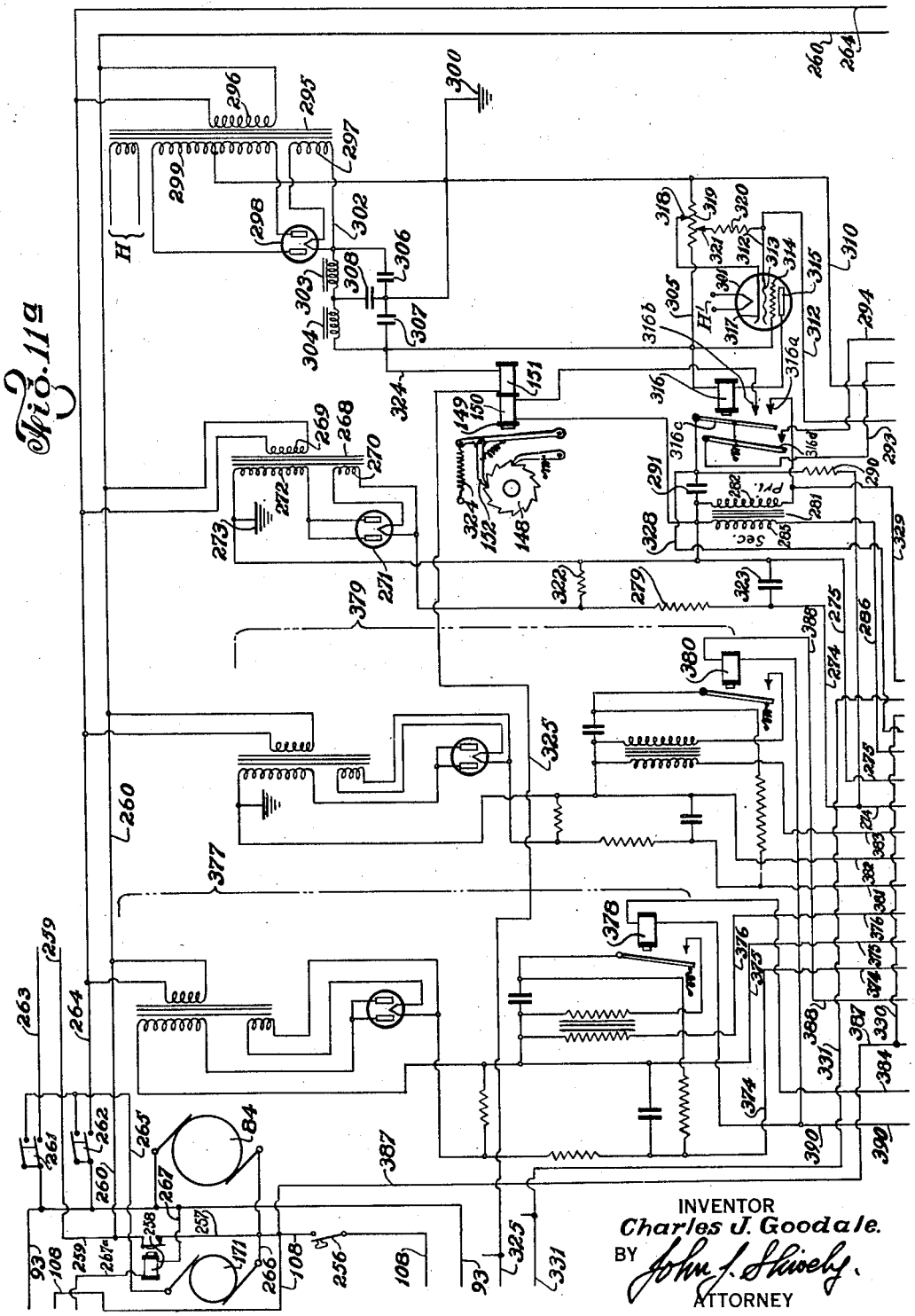

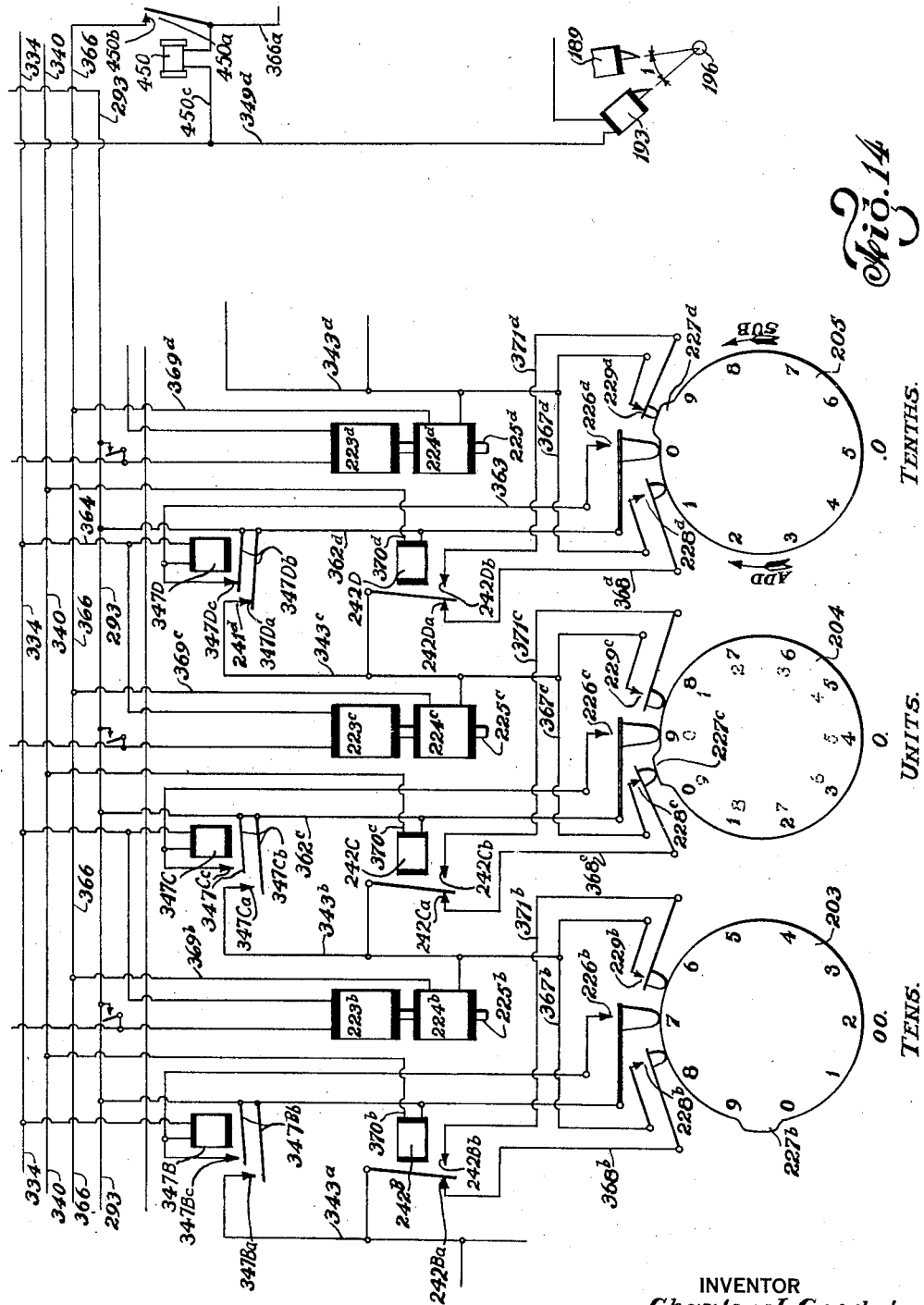

May 9, 1944.     C. J. GOODALE     2,348,535
ACCOUNTING APPARATUS
Filed Feb. 9, 1939     12 Sheets-Sheet 11

INVENTOR
Charles J. Goodale
BY John J. Shively
ATTORNEY

May 9, 1944.　　　　C. J. GOODALE　　　　2,348,535
ACCOUNTING APPARATUS
Filed Feb. 9, 1939　　　12 Sheets-Sheet 12

INVENTOR
CHARLES J. GOODALE
BY
　　Van Deventer + Grier
　　　ATTORNEYS

Patented May 9, 1944

2,348,535

UNITED STATES PATENT OFFICE 2,348,535

ACCOUNTING APPARATUS

Charles J. Goodale, Falmouth, Mass., assignor, by mesne assignments, to General Electric Company, Schenectady, N. Y.

Application February 9, 1939, Serial No. 255,387

16 Claims. (Cl. 235—61.8)

This invention pertains to improvements in accounting apparatus.

In my Patent No. 2,251,998, August 12, 1941, there is set forth an improved method and apparatus by means of which item entries, facts, details or representations of a desired or specific classification or classifications may be selected from mediums carrying items or entries of various classifications or groupings in any order on a single medium, whereby replicas or representations of said entries, etc., falling in a certain classification or classifications may be recorded on an individual vehicle or plurality of vehicles.

An object of the present invention is to provide an improved apparatus of the above nature adapted to carry out various further accounting functions.

A further object is to provide an improved means for automatically adding or subtracting item entries of a desired or specific classification or classifications selected from the medium or mediums carrying the various classifications or groupings in any order.

Another object is to provide improved apparatus wherein the performance of the various accounting functions may be automatically controlled through the action of radiant energy in cooperation with control symbols or data associated wtih the individual item, entries or the like.

Still another object is to provide improved means to individually record the various selected classifications and their additional subtractional totals.

A further object is to provide improved adding, subtracting and totalizing apparatus operable in accordance with the above method and adapted to be disposed in any desired relation to the classifying control means.

Still another object is to provide unitary adding or subtracting apparatus controllable electrically and operable without further mechanical connection with the control means.

A further object is to provide adding and subtracting apparatus of the above type including improved means for effecting carryovers, setting up negative totals, and for clearing the accumulators.

Other objects and advantages of the invention will appear during the course of the following description in connection with the accompanying drawings, in which:

Figure 4 is a transverse sectional view of the lines 4—4, Figure 3;

Figure 4a is a rear detail view of the main driving apparatus;

Figure 5 is a detail view of a film driving roller and ratchet structure;

Figure 6 is a longitudinal sectional view of one of the unitary adding and subtracting assemblies;

Figure 6a is a detail plan view of a numerical drum;

Figure 7 is a cross sectional view of the computing mechanism in the plane 7—7, Figure 6;

Figure 7a is a detail view of the clearing latch;

Figure 8 is a horizontal sectional view of the clutch apparatus in the plane 8—8, Figure 6;

Figure 9 shows a typical general item and control sheet;

Figure 10 is a fragmental detail view illustrating the cooperation of the master strip and related control apparatus;

Figure 15:
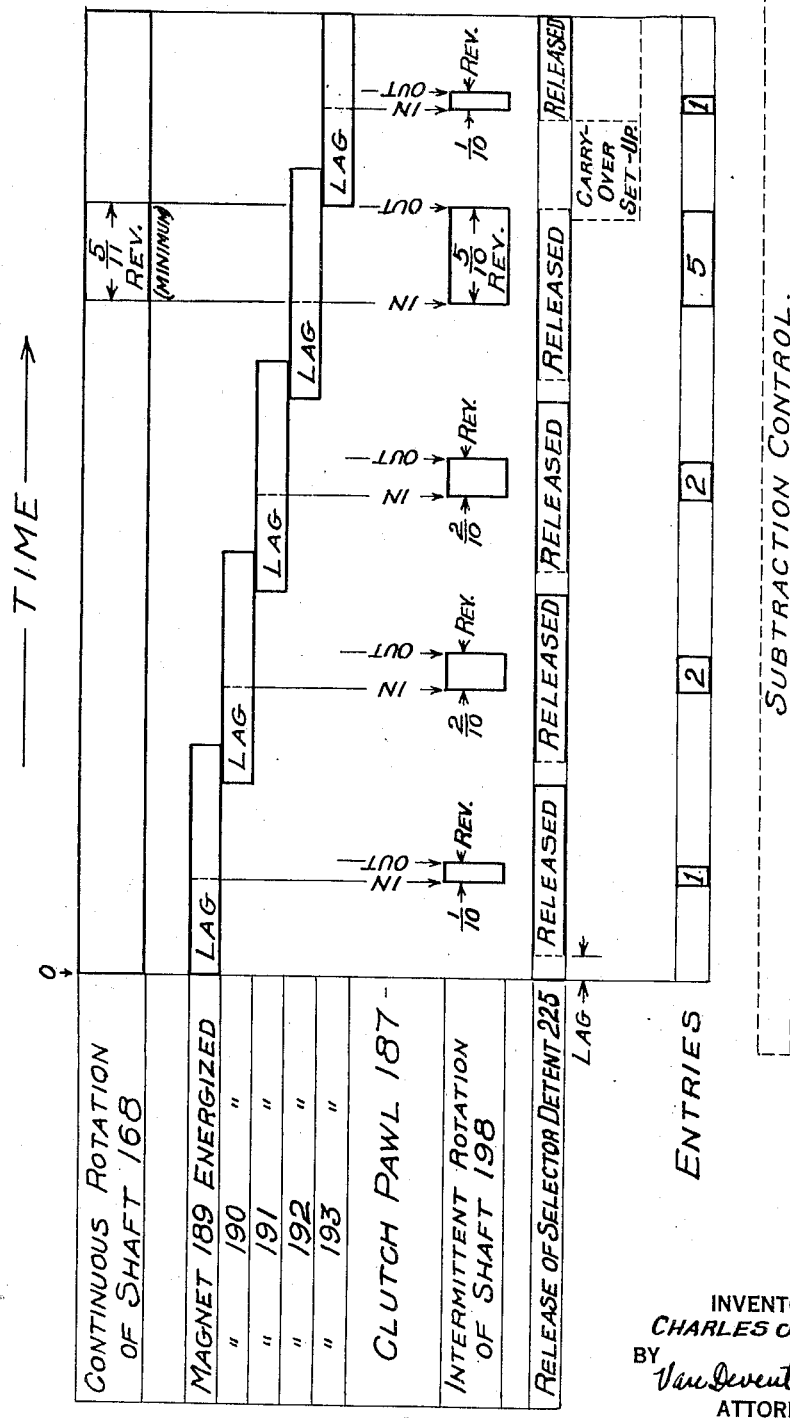

Figures 11, 11a and 12 together form an electrical diagram showing the connections of the various elements of the classifying computational and recording apparatus;

Figure 13 is a fragmental detail section of the magazine closure slide structure;

Figure 14 is an enlarged partial electrical diagram illustrating the accumulator connections; and Figure 15 is a timing chart.

Figure 1:
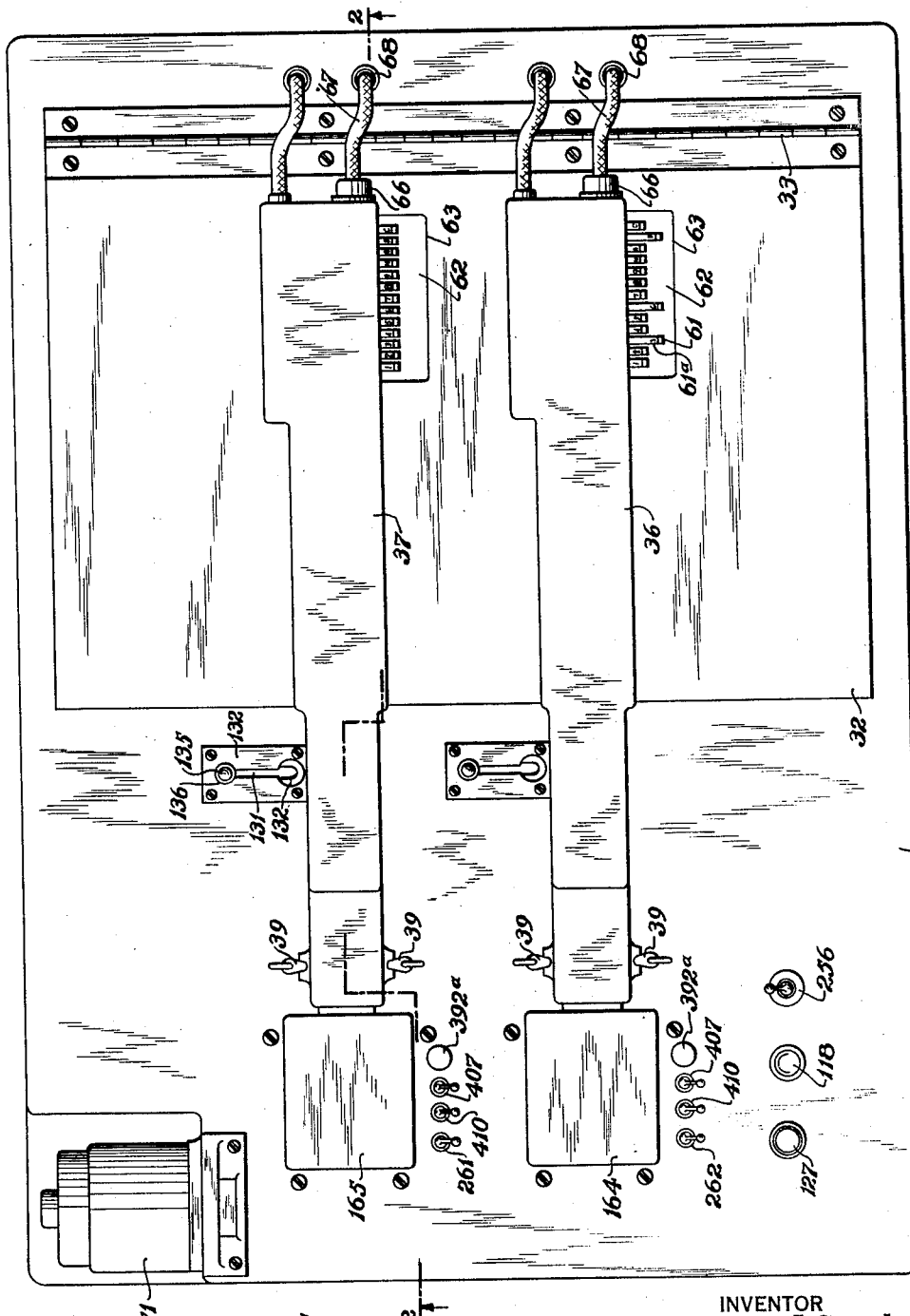
Figure 1 is an exterior plan view of a preferred form of device adapted to carry out the above method.
Figure 2:
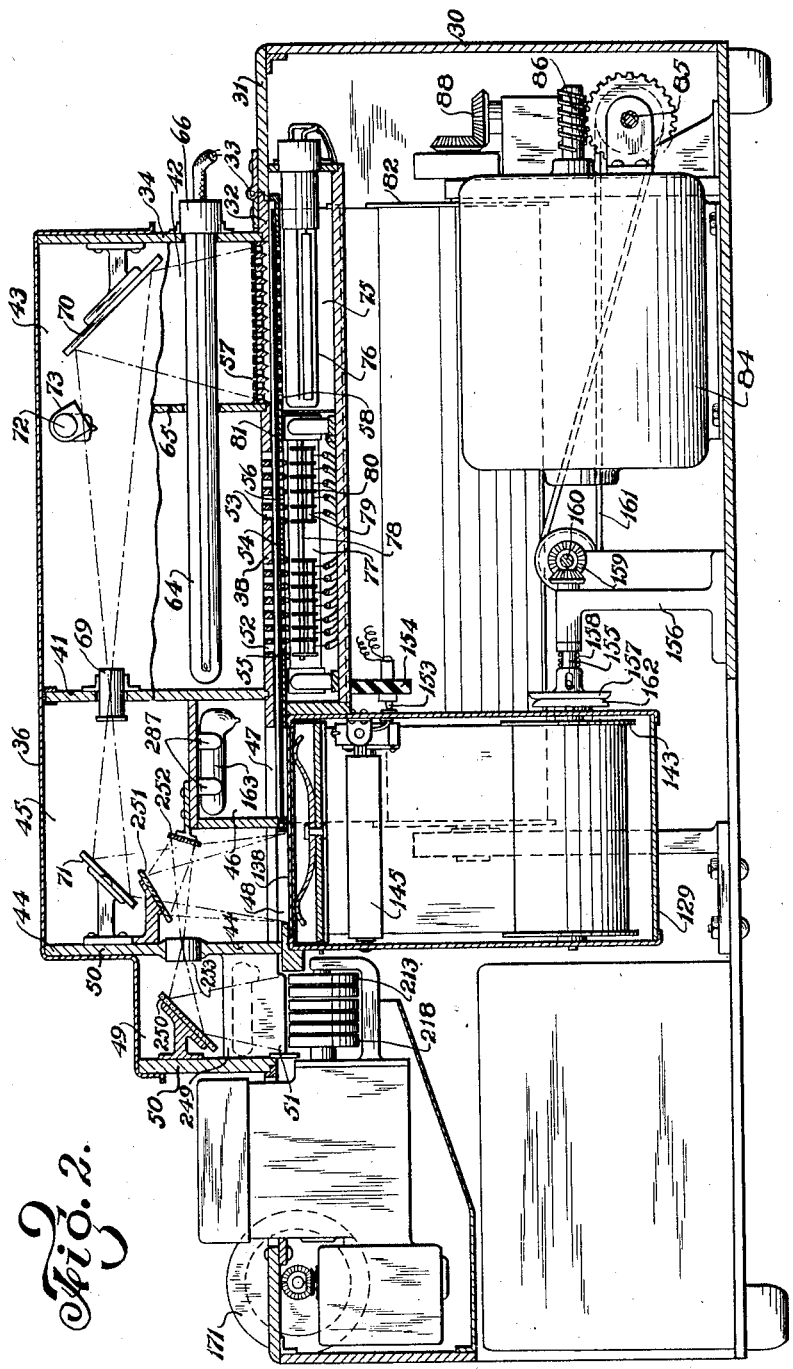
Figure 2 is a longitudinal vertical section of the above device on the lines 2—2, Figure 1.
Figure 3:
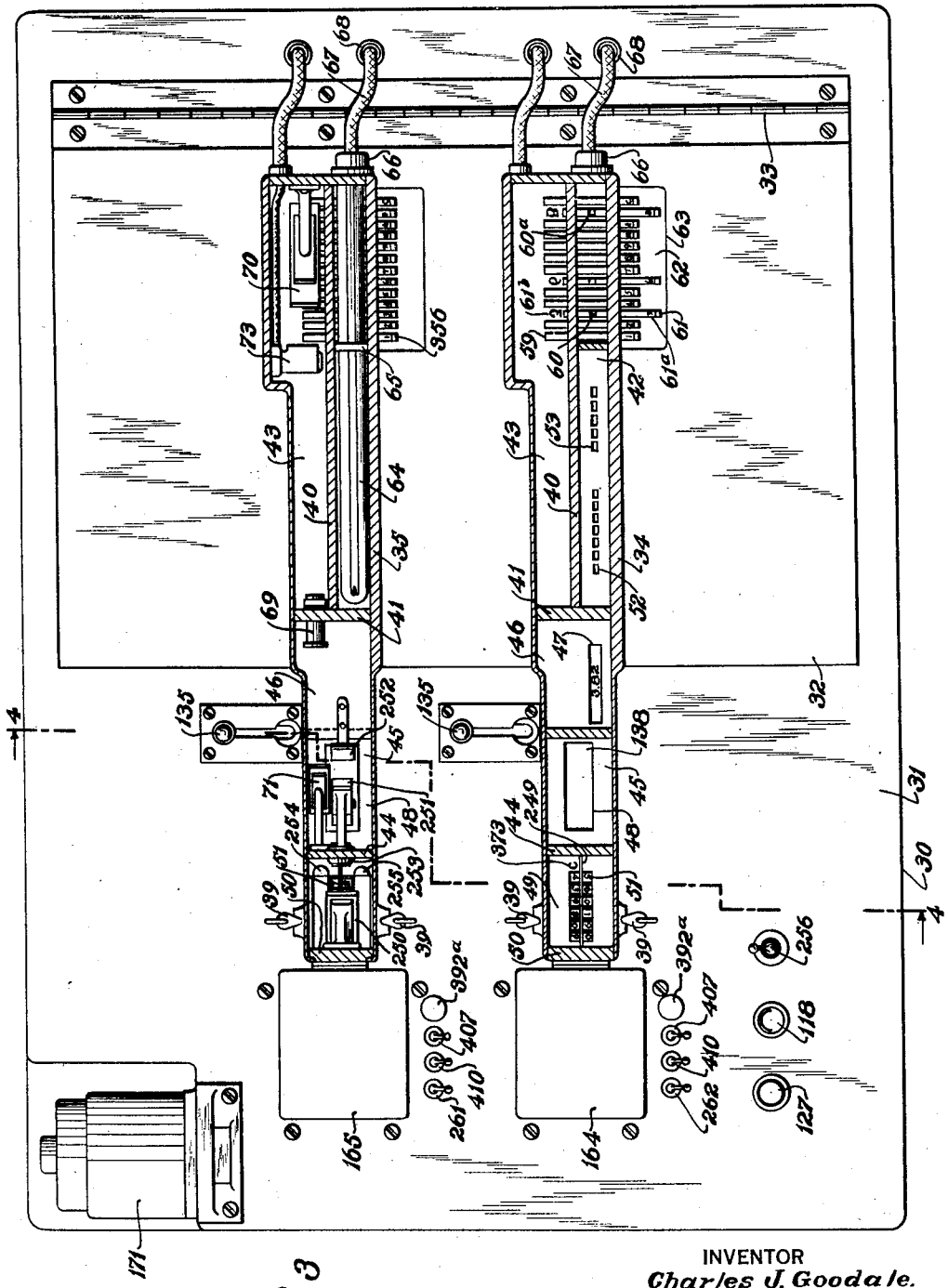
Figure 3 is a horizontal sectional view in the planes 3—3, Figure 4.

Referring to Figures 1, 2, 3 and 4, the numeral 30 designates a casing in the top plate 31 of which is disposed a panel 32 hinged at 33. Housings or classifying sections 34 and 35, Figures 2, 3 and 4, secured in light-tight relationship to the panel 32, are provided with removable light-tight covers 36 and 37. The entire assembly of panel 32 and housings 34 and 35 is adapted to be swung upward on the hinge 33, and the front ends of the housings close upon the top plate 31 in light-tight relationship, their bottoms 38, Figure 4, forming in effect extensions of the panel 32. When the panel and housing assembly is in closed position as shown in the drawings, clamps 39, Figures 1 and 3, are used to maintain the parts firmly together.

The housings 34 and 35 are divided internally into a number of chambers and as these chambers are identical in both housings, they have been given the same identifying numerals to simplify the description. Referring to Figures 2 and 3, it will be seen that a longitudinal wall 40, extending from the rear of each housing to a cross partition 41, provides two narrow longitudinal chambers 42 and 43.

A second cross partition 44 is situated forwardly of partition 41 and defines therewith a third chamber 45. A small light-tight box 46 is disposed in the lower rear corner of the chamber 45 overlying a slot 47 in the bottom 38. A wide slot or window 48 in the bottom 38 opens into the chamber 45. A fourth chamber 49 comprised between the partition 44 and the front wall 50 of the casing, overlies a third slot 51 in the bottom 38.

A series of small apertures 52, 52a, 52b, 52c, 52d, 52e and 52f and a second series 53, 53a, 53b, 53c and 53d longitudinally spaced therefrom, are provided in the bottom 38 under the chamber 42. A plate 54, Figure 2, secured in the main casing 30 below the plate 32 and casing bottom 38, has a plurality of apertures 55 and 56 underlying and in registry with those of series 52 and 53. A third series of apertures 57 in the bottom 38, registering with corresponding apertures 58 in the plate 54, are normally covered by cross slides 59.

The slides 59 are guided in light-tight relationship in the partitions 40 and the outer walls of the casings 34 and 35. The slides are provided with apertures 60, 60a, etc., which normally underlie the partition 40, but when in selecting position as shown in casing 34, Figure 3, the slides are drawn outward to bring the slide apertures into registry with corresponding apertures of the series 57 as shown in detail in Figure 10. Upturned tips 61 on the slides 59 are provided for drawing the latter outward, and the surface of the plate 32 is depressed slightly at 62 to receive the ends of the slides, the edge 63 of the sunken portion 62 serving as a stop to assure accurate registry of the apertures. The slides are designated beginning at the left by successive digit numerals 1, 2, 3, 4, 5, 6, 7, 8, 9, 0 and letters A, B, and C as shown at 61a. Similar numerals and letters 61b are imprinted upside down on the bottom 38 in chamber 43 in such positions as to be normally covered by their respective slides but adapted to be uncovered when the slides are drawn forward, as illustrated in Figures 3 and 10.

A source of radiant energy 64, which may be, for example, an elongated filament lamp provided with a support 65, is disposed in each chamber 42 overlying the apertures 52, 53 and 57. The lamp 64 is provided with a socket 66 in the rear wall of the housing 34 and 35. Flexible supply conductors 67 lead from the sockets 66 and enter the casing 30 through bushings 58.

A lens system 69 is adjustably mounted in the partition 41 between the chambers 43 and 46. An inclined mirror 70, Figures 2 and 3, is adapted to reflect an image of any uncovered numerals and letters 61b through the lens 69 against a second inclined mirror 71 in the chamber 45. The inclined mirror 71, which is also slightly tipped laterally, directs the image downward into the slot 48. A second source of radiant energy 72, preferably of the mercury flash type hereinafter described, is disposed in the top of the chamber 43 and is provided with a reflecting hood 73 adapted to direct the radiant energy downward on the numerals and letters 61b. The source 72 is also provided with a flexible external supply cable 74.

Situated under the plate 54 is an elongated light-tight chamber 75 containing a photo-cell 76 underlying the apertures 58. A second photo-cell 77, preferably of the multiple-cathode type, is disposed directly under the apertures 55, 56 in plate 54. This multiple photo-cell, the structure of which in itself is not part of the present invention, may be of the general type fully disclosed in Patent No. 2,140,799, dated December 20, 1938, to A. A. Kucher, and is illustrated diagrammatically in Figures 2 and 11. The cell 77 includes a single anode 78 and a plurality of cathodes 79 separated by light-tight and insulating walls 80, each cathode being located directly below one of the apertures 52 or 56. It is obvious that if desired the apparatus may be constructed with a separate complete photo-cell for each aperture 52 and 56, but the multiple cell is preferred for compactness.

Figure 9A:
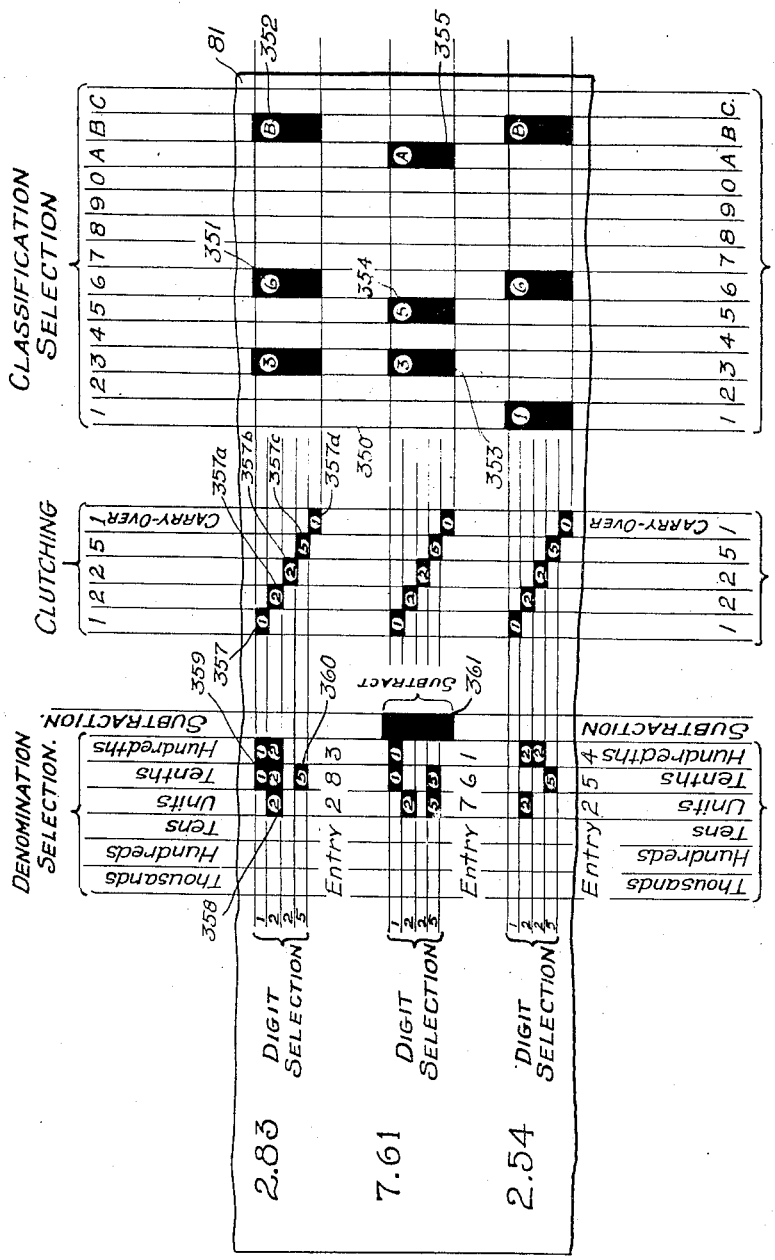
Figure 9a is an enlarged view of the item and control sheet, showing details of the various zones and the horizontal and vertical alignment of the various symbols.

A master control record or strip 81, hereinafter described in detail in connection with Figures 9 and 10, is slidably disposed between the bottom 38 and the underlying plate 54. The strip 81 is wound on suitable reels 82 and 83 rotatably mounted in the cabinet 30 as shown in Figures 2, 4 and 4a. By rotation of the reels the strip 81 may be drawn rapidly between apertures 47, 52, 53 and 57 in the bottom 38 and the corresponding apertures in the lower plate 54.

A motor 84 drives a cross shaft 85, Figures 2, 4 and 4a through worm gearing 86. The reels 82 and 83 are adapted to be driven from the shaft 85 through bevel gear trains 87 and 88 and magnetic clutches 89 and 90 respectively. The hubs 91 and 92 of reels 82 and 83 to which the ends of the strips are secured in any suitable manner, Figure 12, are made of metal and are electrically connected to a supply conductor 93 preferably through their supporting frames 94 and 95, Figure 4a, which may be insulated from the cabinet 30 and from the motor 84. The strip 81 is of insulating material such as paper, and spring fingers or brushes 96 and 97 press against the portions thereof rolled on the hubs 91 and 92 so that when the strip is unrolled sufficiently from either hub to allow the corresponding spring finger to engage the surface of the hub, an electrical contact may be established.

Referring to the electrical diagram, Figure 12, it will be seen that conductors 98 and 99 connect the brushes 96 and 97 to the magnets 100 and 101 of a two-way toggle switch 102, the arm 103 of the switch 102 being adapted to establish engagement between a movable contact member 104 and fixed contacts 105 and 106 respectively in its right and left-hand positions. The movable contact is connected through a flexible conductor 107 with the second supply conductor 108. Magnets 100 and 101 are also connected to the supply line 108 by means of leads 109 and 110 respectively.

The fixed contact 105 of toggle switch 102 is connected through lead 111 to the magnetic clutch 89 from which a connection is made through conductor 93. The second fixed contact 106 is connected through a lead 114 to one side of normally closed relay contacts 115a, the other side of the breaker being connected through a lead 116 to the second magnetic clutch 90. From clutch 90 a connection is made through wires 117 and 113 to the first supply conductor 93. A normally open manual switch 118, hereinafter referred to as the starter switch, is connected across the breaker contacts 115a by means of wires 119 and 120.

A swinging arm 121, operable by depression of the starter switch 118, has thereon a spring-pressed pawl 122 adapted to actuate a small ratchet wheel 123. A holding pawl 124, also engages the ratchet wheel 123, and when the wheel is revolved the oscillations of the holding pawl 124 are adapted to cause a series of contacts between a pair of switch points 125 and 126 situated behind the pawl and insulated therefrom.

The connections and purpose of the switch points 125 and 126 will hereinafter be described in connection with Figure 11a. A second manually operable switch 127, the purpose of which will also be hereinafter explained, is also adapted upon closure to actuate the arm 121 through a sliding rod 128.

The magnet of the relay 115 is connected by wires 430 and 431 with the leads 99 and 110 respectively, being thus arranged in parallel with the magnet 101 of the toggle switch 102.

The operation of the master strip moving apparatus set forth above is as follows:

The motor 84 being in operation, the shaft 85 is rotated continuously through the worm gearing 86. The forward or operating movement of the strip 81 is to the left in Figures 4 and 12 in which the apparatus is viewed from the front of the machine, this direction of movement of course being to the right in the rear view, Figure 4a.

Referring to Figure 12, the parts are illustrated in starting position, that is with the strip 81 unrolled from the reel 83 so that the brush 97 is in contact with the metallic hub 92. Current passes from the supply conductor 93 through the hub 92 and lead 99 to the toggle switch magnet 101, thence back to the second supply conductor 108. The magnet 101 is energized throwing the arm 103 to the left as shown and bringing the contact member 104 into engagement with the contact 106. Thereby a connection would normally be completed from the supply conductor 93 through leads 113 and 117, clutch 90, lead 116, breaker 115, lead 114 contacts 106 and 104, and flexible lead 107 to the supply conductor 108. However, as the relay magnet 115 is connected in parallel with magnet 101, the former is also energized, thus holding the contacts 115a open.

The above described connection is therefore not completed and the clutch 90 is not energized so that the reel 83 remains at rest. To start the cycle, the manual switch 118 is closed, thus completing the above circuit around the contacts 115a through leads 119 and 120. The clutch 90 engages and revolves the reel 83, winding the strip 81 on reel 83 and off the reel 91, the strip being thus drawn between the bottom 38 and sub-plate 54, Figure 2. The first layer of the strip 81 which envelopes the hub 92 breaks the electrical contact between the hub and the brush 97. The magnet 101 and also the relay magnet 115 are thereby de-energized, allowing the contacts 115a to close. Thus, when the manual starting switch 118 is released, the closed contacts 115a maintain the above described clutch circuit, the strip 81 being continuously unreeled from reel 82 until the end of the final layer thereon passes under the brush 96. As the brush 96 encounters the bare metal of the hub 91 it completes a circuit from the supply conductor 93 through the hub 91, brush 96, lead 98, toggle switch magnet 100 and lead 109 back to conductor 108. The magnet 100 is energized, throwing the toggle switch lever 103 to the right and moving the contact member 104 out of engagement with contact 106. This action breaks the described circuit through clutch 90, disengaging the latter, and immediately thereafter completes a circuit from the supply conductor 93 through lead 112, magnetic clutch 89, lead 111, contacts 105 and 104, and flexible lead 107 back to conductor 108. The clutch 89 engages and rewinds the strip 81 on the reel 82 until the latter's unwinding from reel 83 permits the brush 97 to again engage the metal hub 92, whereupon the electrical contact thereby established operates in the manner previously described to restore the apparatus to start position as shown, the opening of relay contacts 115a causing the reels to remain at rest until the next operation of the starting switch 118.

From the foregoing it will be noted that a single depression of the starting switch 118 causes the master strip 81 to be moved completely through the machine in the forward or working direction and automatically rewound to starting position. The gearing 87 connecting the reel 82 to the shaft 85 may be of higher driving ratio than gearing 88 of reel 83, causing rewinding to occur at higher speed than the forward or working motion, thereby saving time on the rewind.

Referring to Figure 4, the numerals 129 and 130 designate film magazines individually removable from the casing 30. The magazine being identical in structure throughout, one is shown in section and the other in exterior view. The magazines are secured in place as follows:

The top plate 31 of the casing has formed therein transverse slots 131, Figures 1, 3 and 4, having enlarged eyes 132 at their right ends, and surmounted by plates 133, the latter being of tapered thickness to form wedges with their greatest thickness at the left as shown in Figure 4. The magazines 129 and 130 have transverse slides 134 equipped with knobs 135. The knobs 135 have enlarged flanges 136 adapted to pass upwardly through the eyes 132 and to overlie the edges of the slots 131 when the knobs are moved to the left into locking position on the wedge plates 133 as shown in the figures. Spring pressed film guides 137 are provided in the upper faces of the magazines, and the slides 134 have inclined edges 137a adapted to engage and force the guides 137 downward when slid to the right. Thus, when the slides are in the position shown in detail, Figure 13, they constitute closures to protect the film 138 against light when the magazines are removed from the machine. The longitudinal locating means for the magazines comprise angle strips 139 adapted to engage offsets 140 on the magazine casings, and resilient members 141 adapted to urge the offsets 140 into the angle strips. It will be observed that in order for the magazines to be either removed from or inserted into the machine, the knobs 133 must be in extreme right hand position to permit flanges 136 to pass through the eyes 132. In this right hand position of the knobs the slides 134 are closed, so that it is impossible to expose the film accidentally in removing a magazine.

In putting a magazine in place the offset 140 is inserted in the angle 139 and the magazine rocked upward, flexing the member 141 and allowing the knob 135 to pass upward through the eye 132. The knob is then moved to the left as shown in Figure 4, the flange 136 sliding up the wedge surface of plate 133 and clamping the magazine firmly in position.

Disposed in each magazine are two reels 142 and 143 upon which is wound the recording medium or film 138. It will be understood, however, that while for the sake of brevity the recording medium 138 is hereinafter referred to as the film, the latter word is not used in the narrow sense of photographic film, as any other suitable recording material such as sensitized paper strips may be used.

Between reels 142 and 143 the film 138 passes over a metallic roller 144, over the spring-pressed guide 137, and over a feed roller 145, Figure 4. A resilient metallic brush 146 presses the film against the first roller 144, while a hinged pressure roller 147 holds it firmly against the feed roller 145.

The feed roller 145 has an outer surface preferably faced with rubber or other suitable friction material. The outer surface is interrupted at one point in its length to accommodate a ratchet wheel 148, as shown in Figure 5. A small step relay 149, having two windings 150 and 151, has a pawl 152 engaging the ratchet wheel 148 and is adapted to advance the ratchet one tooth for each electrical impulse directed through either winding. All electrical connections for the relay 149 are carried out of the magazine as shown in Figure 2 by means of spring pressed pin contacts 153 disposed in an insulating panel 154 secured in the casing 30.

A shaft 155, journalled in a support 156, Figure 2, carries on its forward end a friction disk 157 urged forward by a light spring 158. The shaft 155 is driven through bevel gears 159 from a cross shaft 160 which in turn is driven through a small belt 161 from the main cross shaft 85. When the magazine is in place the disk 157 is lightly engaged by a second disk 162 on the end of the shaft of the lower film reel 143. Thus in operation, the revolving disk 157 slipping on the second disk 162 imparts a rotary urge to the lower reel 143 which is insufficient to overcome the friction of the spring member 146, Figure 4, but which serves to keep the film taut. This forward urge also assists the forward feed of the film and acts as a take-up when the step relay 149 is operated.

It will be noted in Figure 2 that the right hand half of the film 138 underlies the master strip 81 directly below the bottom slot 47 of the light-tight box 46, while the left half of the film is directly exposed to the slot 48 in the bottom of chamber 45. A source of instantaneous illumination such as a mercury flash lamp 163 is disposed in the box 46.

Computation units 164 and 165 (Figs. 1 and 2) are secured in the front portion of the casing 30 in line with the housings 36 and 37 respectively. As these units 164 and 165 are identical in structure and function, the structure and operation of unit 164 will be described as typical of both.

Referring to the enlarged longitudinal section, Figure 6, numeral 166 designates a clutch casing secured to the left end of the main body 167 of the computation unit 164. A vertical shaft 168, journalled in the clutch casing 166, is adapted to be continuously driven through bevel gearing 169 from a cross-shaft 170, the shaft 170 in turn being driven by a suitable motor 171, Figures 1, 2, 3 and 11a. It is obvious that if desired an individual motor may be provided for each computation unit.

Rotatably mounted on the shaft 168 is a sleeve member 172 longitudinally located between two collars 173 and 174. Two bevel gears 175 and 176 rotatably fitted on the sleeve 172 are provided with dog teeth 177 and 178 adapted to be meshed with similar teeth on the ends of a clutch or dog ring 179 slidably keyed to the sleeve 172. The ring 179 is provided with a shifter yoke 180. The yoke carries pivots, one of which is shown in dotted lines at 180a. When in operation an electro-magnet 181, acting through an armature 182 and link 183, normally holds the yoke 180 and clutch ring 179 downward so that the gear 176 is clutched to the sleeve 172. When the magnet 181 is de-energized a tension spring 183a snaps the yoke 180 upward drawing the clutch ring 179 out of mesh with teeth 178 and into mesh with teeth 177 on the upper gear 175, thus releasing the lower gear 176 and clutching upper gear 175 to the sleeve 172.

The upper collar 173, which is fixedly secured to the shaft 168, has formed thereon a ratchet wheel 184, shown in plan view in Figure 8. The sleeve 172 has on its upper end a circular flange 185 closely underlying the ratchet wheel 184, and a resilient friction ring 186 is disposed between the sleeve 172 and collar 173 in suitable recesses. Thus rotation of the collar 173 acts through the ring 186 to exert a continuous frictional rotative urge on the sleeve 172 and flange 185.

A detent 187, Figure 8, pivotally mounted on the flange 185, is adapted to engage the ratchet 184 and is urged toward engagement therewith by a spring 188. The detent 187 has thereon an outwardly extending tail 188a. Five magnetic latches 189, 190, 191, 192 and 193, arranged circumferentially with respect to the flange 185, have armatures 194, 194a, 194b, 194c and 194d respectively adapted normally to engage the tail 187a. When the tail 187a is engaged by any armature, for instance as by armature 194 of latch 189 as shown in Figure 8, the forward motion of the flange 185 moves the detent 187 out of engagement with the ratchet 184 and against a stop 195. The frictional urge of the ring 186, previously described, is sufficient to overcome the torsion of spring 188, so that the detent 187 and flange 185 are held stationary in the position shown in Figure 8. If the magnetic latch 189 is energized, the detent 187 is released thereby and snapped into engagement with the ratchet 184, causing the flange 185 to be rotated in the direction of the arrow, Figure 8, until the tail 187a encounters the armature 194a of latch 190, which again releases the detent and stops rotation of the flange 185. Similarly, energization of magnetic latch 190 permits the flange to further rotate until the tail 187a engages the next latch armature 194b, and so on throughout the revolution.

The mechanism just described thus constitutes an intermittent or step clutch, hereinafter generally referred to as the master clutch 196.

The position of the parts shown in Figure 8, that is with the detent 187 held by the latch 189, is the zero or starting position of the master clutch cycle. The magnetic latches are so arranged circumferentially that the angular distance in the forward or clockwise direction from latch 189 to latch 190 is one-eleventh of a circle, from 190 to 191 is two-elevenths, from 191 to 192 is two-elevenths, from 192 to 193 is five-elevenths, and from 193 to 189 is one-eleventh. Thus, if the latches are energized successively, it is evident that the master clutch sleeve 172, and with it whichever gear 175 or 176 is locked thereto by the dog ring 179 will be driven through a complete revolution in successive angular steps having the relation of 1, 2, 2, 5, and 1.

Referring to Figure 6, the bevel gears 175 and 176 are in mesh at diametrically opposite points with a third bevel gear 197 secured to a rearwardly extending shaft 198. The number of teeth of either gear 175 or 176 with respect to the number of teeth of the third gear 197 is in the relation of eleven to ten. It is evident, therefore, that when the master clutch revolves throughout one complete revolution, the shaft 198 is rotated throughout one and one-tenth revolution.

The shaft 198 has secured thereon a plurality of resilient frictional drivers 199 arranged in co-operative pairs, each pair embracing between them a spur gear wheel 200 rotatable on the shaft 198. Thus if the wheels 200 are unrestrained when shaft 198 is rotated they are also rotated by the friction members 199, but when the gear wheels are restrained from rotation the friction members slip and allow the shaft to turn in the gears.

Each gear 200 is in mesh at one-to-one ratio with a similarly toothed accumulator wheel, there being in the present example six accumulator orders designated from left to right in Figure 6 by numerals 201, 202, 203, 204, 205 and 206. These accumulator orders are secured to nested shafts 207 to 212 inclusive respectively and these shafts carry on their opposite ends numerical drums 213 to 218 inclusive, the inner shaft 207 being supported on ball bearings 219.

As all the accumulator orders and related apparatus are identical in form, the structure and operation relating to the order 201 is herein described as typical. The outer rim 220 of order 201 has therein 10 digital positioning notches 221, 221a, 221b, etc. as shown in Figure 7.

A magnetic selector latch 222 having two independent releasing magnets 223 and 224, is provided with a detent 225 adapted to engage the notches 221, 221a, etc., and thereby restrain the accumulator member or order 201 and its gear 200 from rotation.

A normally open contactor 226 is adapted to be closed by a cam lobe 227 on the accumulator order 201, the lobe being so located as to close the contactor 226, hereinafter referred to as the carry-over contactor, as the accumulator member 201 is moved between the nine (9) and zero (0) positions in either direction. A second contactor 228, hereinafter referred to as the positive contactor is so located as to be closed by the same lobe 227 when the accumulator member is in nine position as shown in Figure 7, while a third contactor 229 is similarly arranged to be closed by the lobe 227 when the accumulator member is in zero position, the third contactor 229 being hereinafter referred to as the negative contactor.

Disposed on a plate 240 in the top of the casing above the latch magnets 223 and 224 are a double-pole relay 347 and a double-throw relay 242, the details and connections of these relays being fully shown on the wiring diagram, Figure 11, and hereinafter described.

A rocker shaft 243, Figures 6, 7 and 7a, extends throughout the length of casings 166 and 167, and has thereon an armature lever 244 adapted to be rocked, as illustrated in Figure 7a, by an electromagnet 245 disposed in the clutch casing 166.

The rocker shaft 243 carries levers 246 extending adjacent the faces of the gears 200 and terminating in flat hooks 247. The gears 200 have secured therein pins 248 extending outwardly toward the levers 246. The location of the pins 248 is such that they normally revolve free of the hooks 247. When the shaft 243 is rocked by the magnet 245, however, the hooks 247 are lowered into position to intercept the pins 248 as shown in dotted and dashed lines in Figure 7a, the gears 200 and their accumulator members being thereby stopped and held as they reach zero positions in the forward direction indicated by arrows in Figure 7. It is evident, therefore, that if the magnet 245 be energized while the shaft 198 is revolved one revolution in the forward direction, all accumulator orders will be cleared.

Figure 6a is a plan view of one of the numerical drums 215, shown as typical of the exterior aspect of all drums 213 to 218. For each digital position of drum 215 and its accumulator order 203 a pair of digits is printed on the periphery of the drums, the sum of each pair of digits being equal to nine. In other words, each drum carries successive digits from zero to nine inclusive in the forward or positive direction with the nines complement on each digit printed closely behind the digit on the circumference.

Due to the use of the nested shafts 207 to 212, it is evident that the denominational order of the drums is reversed with respect to that of the corresponding accumulator orders, for example, the lowest denominational order 206, located at the right of the accumulator series, controls the drum 218 at the left end of the group of drums. To bring the figures on the drums in proper relationship, therefore, the digits are printed upside down as the parts are viewed in Figures 6 and 6a.

Referring to Figures 2 and 3, it will be seen that the drums 213 to 218 are located directly below the bottom opening of window 51 in the chamber 49 so that a complete set of digits and their nines complements are exposed through the opening. A thin vertical partition 249 spans the window 51 so as to divide the row of exposed digits from their row of nines complementary digits. Three angular mirrors 250, 251 and 252 and a lens 253, the latter disposed in the partition 44, are adapted to project an image of the exposed portions of the numerical drums on to the film 138 as shown in dotted and dashed lines, Figure 2. Two small hooded sources of illumination 254, and 255, Figures 2 and 4, preferably mercury flash lamps or the like, are located on the walls of the chamber 49 on opposite sides of the partition 249. It is evident that if either lamp is actuated it will illuminate only the row of digit numerals on its side of the partition and consequently the image of only that row is projected on the film 138.

Referring to the wiring diagrams, Figures 11a and 11, it will be seen that a manual stop switch 256 is provided in the main supply conductor 108 (which is connected to a source of A. C. supply), and a short conductor 257 leads through a normally closed magnetic breaker 258 to two branch supply lines 259 and 260. Two double pole manual switches 261 and 262 are adapted respectively to close connections between the main supply conductor 93 (which is also connected to the A. C. supply) and two branch supply lines 263 and 264. It will be understood that while the supply lines 264 and 260 furnish current as hereinafter described to the apparatus associated with section 34, Figures 1 and 3, the two similar conductors 259 and 263 perform a like function for the mechanism respecting section 35, and are connected thereto by means duplicating that shown in Figures 11 and 11a.

The switches 261 and 262 are also adapted to close connections between the conductor 93 and a wire 265 leading to the motor 171, a short lead 266 and the conductor 257 completing the motor circuit back to supply conductor 108. The main drive motor 84 is connected directly across branch 257 and the supply conductor, so that this motor is always in operation when the manual stop switch 256 is closed.

The magnetic breaker 258, Figure 11a, has control leads 267 and 267a connected respectively to the supply line 93 and to the conductor 111, Figure 12, being thus connected in parallel with the magnetic clutch 89 and operable concurrently with the latter. By this means, when the clutch 89 is engaged and the master strip is being rewound to starting position, the breaker 258 is held open, cutting off the current supply to branches 259 and 260 to disable the classifying and computing mechanism to avoid false entries in the latter.

A transformer 268, Figure 11a, has its primary 269 connected across the branch supply lines 260 and 264. A heater winding 270 of the transformer is connected to the filament of a rectifier tube 271. A high voltage winding 272 has one end thereof connected to the plates of the rectifier tube 271 and the other end grounded at 273. The transformer and rectifier just described are for the purpose of furnishing power to the mercury flash lamp 163, Figure 11. This lamp is described in a book entitled "Flash," by Edgerton and Kilian and published by Hale, Cushman and Flint of Boston, Massachusetts. The cathode 276 of the lamp 163 is connected through the contacts 327b, a normally deenergized four-pole relay 327 and a wire 275 to the ground 273, Figure 11a.

The anode 278 of the lamp 163 is connected through the contacts 327a and a conductor 274 to a resistor 279, Figure 11a, and thence to the filament of the rectifier tube 271. A condenser 323 bridges the anode and cathode of the lamp.

A high voltage induction coil 281 has one end of its primary 282 connected to the ground at 273; and the other end of the primary is connected to the contact point 316a of a relay 316, so that when this contact point is closed, it is connected to the anode of the flash tube 163 and to the filament of the rectifier tube 271 (which is the source of high voltage) through resistor 279.

The secondary 285 of the induction coil 281 has one terminal thereof connected via a wire 286 and the contact 327c, of relay 327 to a conductor or plate 287 positioned closely adjacent the envelope of the mercury flash lamp 163 in the vicinity of the latter's anode and pool of mercury. The other end of the secondary 285 is connected to ground 273. One terminal of the winding 150 of the film-advancing step relay 149 is connected to ground 273, the other terminal being connected to a second contact point 316b of the relay 316.

The armature 316c of the relay 316 is connected to a source of high voltage through a resistor 290 and a condenser 291 by-passes the same to ground.

The contact points 316a and 316b are so positioned relative to the armature 316c that when the latter is attracted by its magnet, as presently described, 316c, 316b and 316a are connected together so that current is supplied to the primary 282 of the induction coil 281, and via the contact point 316b to the step-relay magnet 150. A second contactor 316d is also operable by the armature 316c of relay 316 to close a connection between wires 293 and 294 for a purpose hereinafter described.

A transformer 295 has a primary 296 connected across the branch supply lines 260 and 264, and a secondary 297 for furnishing current to the filament of a rectifier tube 298.

The transformer 295 also has a high voltage secondary 299 having its terminals connected to the plates of the rectifier 298, and a center tap thereof connected to ground at 300.

The transformer 295 further has a heater winding H which is connected to the heater H' of a tube 301. These last-named heater connections are not actually shown, it being customary in electronic circuits to indicate such connections in order to make the circuit diagrams less complicated.

The filament wire 302 from secondary 297 is connected via chokes 303 and 304 to a wire 305. A filter condenser 306 bridges the choke 303, and a condenser 307 bridges the choke 304, a third condenser 308 being in series between the common connections between the filter condensers 306 and 307 and the chokes 303 and 304.

The photo-electric cell 76, Figure 11 has its cathode 309 connected through a wire 310 to ground 300, Figure 11a, and its anode 311 connected via a wire 312 to the control grid 313 of the tube 301. The screen grid 314 of the tube 301 is connected to the wire 305 so that it will receive the full voltage of the rectifier. The plate 315 of the tube 301 is connected to one terminal of the magnet coil 316. The other terminal of the coil is connected to the wire 305 so that when plate current flows in the tube 301, the coil is energized. The cathode 317 of tube 301 is connected to one arm 318 of a potentiometer 319. The potentiometer winding is connected between the wire 305, which is the high voltage supply, and ground 300, so that the bias in the tube 301 may, by means of the arm 318, be set to a point where no plate current will flow except when light tending to pass to the photo-electric cell 76 is impeded.

The grid leak 312 is connected via a resistor 320 to a second potentiometer arm 321 so that the bias on the grid 313 may be adjusted to any desired value. In adjusting the tube 301 so that no plate current flows except when light tending to pass to the cell 76 is impeded, both the arm 318 and the arm 321 may be adjusted. A biasing resistor 322 is connected from 274 (ahead of the series resistor 279) to the ground 273. From this it will be seen that when no light or impeded light is received by the cell 76 due to the blocking of apertures 57 and 58 by action of the master strip 81 as hereinafter explained, the coil 316 is energized, thereby closing the contacts 316a and 316b and actuating the mercury lamp 163. At the same time, due to the closing of contacts 316a and 316b, the magnet 150 is energized, thereby attracting the armature thereof and advancing the pawl 152 on the ratchet wheel 148. As soon as the control patterns on the master strip 81 in control, uncover the apertures 57 and 58, permitting the cell 76 to receive light, the coil 150 is de-energized and the armature spring 324 moves the pawl 152 in the reverse direction, thereby advancing the ratchet wheel 148 and thus advancing the film 138, Figure 4.

The second winding 151 of the step relay 149 has one terminal connected via a wire 324 to the rectifier to obtain voltage therefrom. The other terminal is connected via a wire 325 to one of the contact points 125, Figure 12, the other point 126 being connected to ground at 326. Thus, whenever either the title switch 127 or starting switch 118 is operated, thereby revolving the ratchet wheel 123, Figure 12, the pawl 124 causes engagement of the points 125 and 126 and energizes the coil 151 to advance the film 138 a number of steps dependent on the number of teeth advanced by the ratchet wheel 123.

The purpose of the foregoing arrangement is to assure the advance of the film to cause a spacing between each recording of a particular classification and the following recording on the same film, as will be clearly set forth presently in the description of the operation of the entire machine. It will be seen that the relay 327, Figure 11, when its magnet is energized, is adapted to divert all connections from the flash lamp 163 to the flash lamp 72, and to close a connection via wires 328 and 329 across the gap between armature 316c and point 316a of relay 316. One side of relay 327 is connected via a wire 330 and wire 387 to the supply line 108, Figure 11a, the other being connected via a wire 331, the title switch 127, Figure 12, and the wires 117 and 113 back to the supply line 93. Closure of the title switch 127 thus actuates the relay 327, releasing energy from the rectifier through the flash lamp 72 which is thereby illuminated.

Referring to Figure 11, it will be seen that the multiple photo-cell 77 has its various cathodes 79 separately connected to suitable electronic amplifiers 332, the common anode 78 having a common connection 333 to all said amplifiers. The amplifiers are of the type adapted to pass a comparatively large output current when their photo-cell controlling elements are darkened. As such amplifiers are well known and their particular structures form no part of the present invention, no further description of them is believed to be required herein.

One output terminal of each amplifier is connected to the conductor 293, which as previously set forth, is adapted to be connected through the contactor 316d of relay 316 and wire 294 with the branch supply line 264. Thus it is evident that unless the relay 316 is energized, no output current can flow from the amplifiers.

The left-hand six amplifiers have their other output terminals individually connected to selector magnets 223, 223a, 223b, 223c, 223d and 223e of accumulator orders 201, 202, 203, 204, 205 and 206 respectively as shown in Figure 11, these magnets being connected on their other sides to a common conductor 334 leading to the branch supply line 260. Thus, if relay 316 is energized by the darkening of the cell 76 and any of the six left-hand cathode members 79 of the multiple cell 77 are darkened, the corresponding selector magnets are actuated to release the latches 225 of their particular accumulator orders.

The seventh amplifier from the left, 332f, is connected via wire 335 to the magnet of a double throw relay 336 hereinafter referred to as the subtract relay and having a normally open contact 336a and a normally closed contact 336b. The contact 336b normally maintains a circuit from the branch supply line 260 through the winding of the clutch shifter magnet 181 shown in detail in Figure 6, thence to the second branch supply line 264. The contact 336a when closed establishes a connection from line 260 to a conductor 340, hereinafter referred to for clarity as the subtract conductor.

The magnets of double throw relays 242, 242a, 242b, 242c, 242d and 242e are connected on one side to the subtract conductor 340 and on the other side to the wire 293. Thus if the subtract conductor 340 is energized all relays 242, 242a, etc., are also energized to throw their armatures to the right. Taking relay 242c as typical in Figure 11 and the enlarged partial diagram, Figure 14, it will be seen in Figure 11 that its normally closed contact point 242Ca is connected to one side of contactor 228c and its normally open contact point 242Cb is connected to one side of the contactor 229c. The other sides of the contactors 228c and 229c have a common connection to a wire 343c which leads to one normally open contact point 347Da of the double pole carryover relay 347D related to the accumulator order 205 of next lower denomination. The second selector magnet 224c of the accumulator order 204 is also connected on one side to the wire 343c, the other side of 224c being connected to the wire 366 and thence to one contact 450b of a normally open relay 450. The second contact 450a of relay 450 is connected via a wire 366a to the supply line 260. The moving contact members 347Db of carryover relay 347D are connected to the conductor 293 and also to one side of the carryover contactors 226d. The other side of carryover contactor 226d is adapted when closed to establish a connection directly from conductor 293 to the magnet 347d, thus bridging the carryover contactor 226d. From the connections just described it will be seen that momentary closure of the contactor 226d passes current between conductor 293 and conductor 334 through the magnet 347d to energize the same and close contacts 347Da and 347Dc. The closure of contact 347Dc maintains the current through 347d even after contactor 226d has opened so that the carryover relay 347D remains energized so long as current is maintained in the conductor 293. It is also evident that closure of contact point 347Da establishes a circuit from conductor 293 through the second selector magnet 224c thence back to conductor 366. The purpose of this arrangement is to provide for carryover from accumulator order 205 to accumulator order 204 as will presently be described in further detail in connection with the full operation of the device.

Further referring to Figure 11, it will be seen that amplifiers 332g, 332h, 332i, 332j and 332k, controllable by darkening or blocking respectively of the light apertures 53 to 53d have output connections via wires 349, 349a, 349b, 349c and 349d respectively to the magnetic latches 189, 190, 191, 192 and 193, each of the latter being connected on their other sides to the branch supply conductor 260. The magnet of relay 450 is also connected from wire 349d to conductor 260 via its wires 450c and 366a.

It has been set forth in the foregoing description that shutting off of the light from the lamp 64 through the apertures of the 57 series causes the mercury lamp 163 to be illuminated and the conductor 293 to be energized; blocking the light through the apertures of the 52 series actuates the respective release latches of the accumulator and also the subtract relay 336 if required; while blocking the light through apertures of the 53 series actuates the magnetic latches of the clutch 196. The manner in which these functions are brought about and coordinated is as follows:

In the foregoing description it has been explained and shown how the master strip 81 is adapted to be drawn between the plates 32 and 54, traversing all the above mentioned apertures. The lamp 64 is of such power that its rays are able to penetrate the main or blank portion of the master strip and thereby keep the photo-cells illuminated so long as only the blank portion of the strip spans the apertures. Figures 9 and 10 illustrate a typical section of strip carrying three item entries namely 2.83, 7.61 and 2.54, these entries forming part of a general list comprising entries under a variety of classifications or accounts. The separating and setting down of all items of a desired group or classification from among the miscellaneous entries of the general list is accomplished by means of cooperation between the slides 59 and certain markings or darkened areas on the master strip 81 in a manner fully set forth in the co-pending application, Serial No. 130,664, and operable in the present case as follows:

Assuming it is desired to sort out all items of a classification 36B, the slides 3, 6 and B are drawn out as shown in Figure 10, thus bringing their apertures 60 in line with the corresponding apertures 57 and 58, Figure 2, and allowing light to pass to the cell 76. The entry 2.83 is of classification 36B, and to represent this classification, black rectangles 350, 351 and 352 are imprinted or otherwise placed on the strip 81 opposite the entry and in line with the set apertures in the slides 3, 6 and B when the strip is in the machine.

As the record strip is drawn through the machine the rectangles 350, 351 and 352 simultaneously register under the apertures of slides 3, 6 and B, impeding the light to cell 76. At the same time the entry numerals 2.83 themselves are in registry with the window 47, being between the mercury lamp 163 and the film 138. The impeding of the light passing to the cell 76 operates in the manner previously described to cause an instantaneous illumination of the flash lamp 163. The intense light from the lamp 163 penetrates the master strip 81 and photographs the entry 2.83 on the film 138 after which the described action of the notching relay 149 advances the film into position for the next operation.

The second item entry, namely 7.61 falls in a classification 35A, having black rectangles 353, 354 and 355 in line with the 3, 5 and A slides. When these rectangles pass the selecting device set as in Figure 9, while the rectangle 353 will block the aperture 60, apertures 60a and 60b of the 6 and B slides will remain unblocked, allowing illumination to pass to the cell 76 and preventing the actuation of the flash-lamp 163, so that the item 7.61 is not photographed. Similarly, an item 2.54 of a third classification 16B will not be photographed, since the aperture 60 will remain unblocked. Thus in a complete series of item entries of various classifications recorded on the master strip 81, only those falling in the classification 36B will darken the photo-cell 76 and be recorded or photographed on the film 138. Obviously the slides 59 may be set to record any desired one of the possible classifications, so that by repeated passages of the master strip 81 through the machine with different settings of the slides 59, item entries of as many different classifications as desired may be separately listed on the film. Since the mechanism and functions related to the section 35, Figure 3, are the same as those of section 34, by setting the slides 356 of section 35 for one classification and slides 59 of section 34 for another, both classifications may be recorded at one passage of the master strip 81. It is also obvious that the machine may be constructed with as many duplicate sets of simultaneously operable selecting apparatus as desired, the two sections 34 and 35 herein being described as typical of the multiple arrangement. Sufficient blank length is provided in every case on the ends of the master strip 81 that all item entries thereon may pass through all selector units.

COMPUTATION

The manner in which the device performs additions, subtractions and the like is as follows:

It has been above noted that the darkening of or the cutting off of light from the cathodes 79 of multiple cell 77 lying under the apertures 53 to 53d, Figure 11, causes actuation of the magnetic latches 189 to 193 respectively of the clutch 196. Referring to Figures 9 and 10, it will be seen that for each item entry a series of five small black rectangles 357, 357a, 357b, 357c and 357d are arranged in step relation in line with the apertures 53 to 53d. When the classification rectangles 350, 351 and 352 darken the cell 76 to actuate the mercury lamp as previously described, the closure of relay 316, Figure 11a, completes a connection from branch line 264 through conductors 294, contact 316a and conductor 293 to the amplifiers 332, which are thus provided with a source of current as long as the apertures 60, 60a and 60b remain darkened. During this period the rectangles 357 to 357d successively block the passage of light through apertures 53 to 53d, causing the magnetic clutch latches 189 to 193 to be successively released. By this means, as previously set forth in relation to Figures 6 and 8, the clutch sleeve 172 and gear 176 are revolved through one complete revolution by steps having the angular relation of 1, 2, 2, 5 and 1.

It has been previously noted that the gear 176, Figure 6, has a greater number of teeth than the gear 197 in the ratio of eleven to ten. Therefore, as the gear 176 performs one complete revolution by steps as noted above, the gear 197 and its shaft 198 are driven through one and one-tenth revolutions, the extra tenth of a revolution being provided by the last step following the release of magnetic latch 193 for the purpose of effecting carryovers as hereinafter explained. Thus, one complete revolution of shaft 198 takes place by steps having the angular relation of 1, 2, 2, and 5. So long as the selector detents 225 of the accumulator remain engaged in the notches 221 of the accumulator orders, no entries can occur in the latter, the friction drivers 199 merely slipping on the gear wheels 200. If, however, any selector detent 225 is released while the shaft 198 performs any of the rotative steps noted, the corresponding gear 200 and connected accumulator order is rotated by friction members 199 an angular distance corresponding to the rotative step. For instance, if detent 225, Figure 7, is released while the shaft 198 is rotated counter-clockwise through its first step of one-tenth revolution, the accumulator order 201 will be turned clockwise from its present nine position to the zero position and thereby an entry of one is effected. Similarly, if 225 is released while 198 performs its second step of two-tenths revolution, an entry of two will be made in the accumulator order. It follows that the release of 225 during the remaining two rotational steps of shaft 198 will effect entries of two and five respectively. It also follows that if the detent 225 be released during two or more rotational steps of shaft 198, the entry will be the sum of the steps.

By effecting entries in any accumulator order of one or more of the rotational steps comprising a complete revolution of shaft 198, any digit entry from one to nine may be made in the accumulator as shown by the following table:

*Table I*

| Steps | Releases |||||||||
|---|---|---|---|---|---|---|---|---|---|
| 1 | 1 |   | 1 |   |   | 1 |   | 1 |   |
| 2 |   | 2 | 2 | 2 |   |   | 2 | 2 | 2 |
| 2 |   |   |   | 2 |   |   |   |   | 2 |
| 5 |   |   |   |   | 5 | 5 | 5 | 5 | 5 |
| Entries | 1 | 2 | 3 | 4 | 5 | 6 | 7 | 8 | 9 |

Referring to the timing chart (Figure 15), it will be noted that the proportionate timings of various parts are given in comparison to each other. For example, the shaft 168 is shown as rotating continuously. The speed of rotation must be such that the entry of the "5" increment, requiring $5/11$ of a revolution of the constantly rotating shaft 168, can occur in sufficiently less time than the total time of energization of magnet 192 to allow for the usual magnetic and mechanical lag in the operation.

Due to the gear ratio, this $5/11$ revolution of the shaft 168, during which the clutch pawl 187 is engaged, produces a movement of $1/10$ of a revolution of the accumulator shaft 198. Obviously, the smaller incremental movements take place in less time than that required for the "5" increment, hence the minimum required speed of the continuously rotating shaft 168 is determined by the requirement for the "5" increment. It will be understood that a higher rotative speed may be provided in order to allow ample time for the entry of this "5" increment in case of a slowing down of the operation of any of the magnetic control apparatus due to wear or for any other reason. The initiation of the subtraction control takes place sufficiently ahead of the entry cycle itself to insure full energization of the magnet 181 and proper conditioning of the reversing mechanism as a negative entry begins.

It has been pointed out in connection with the description of Figure 11 that darkening the anodes of multiple photo-cell 77 below apertures 52 and 52e causes energization respectively of the release magnets 223 to 223e respectively, these magnets being adapted to release the detents of accumulator orders 201 to 206 respectively.

It being required (for example) to enter the quantity 2.83 in the lowest three orders 204, 205 and 206, blocking rectangles are provided on the master strip 81 as follows:

From the above table, the entry of digit 2 requires a release of detent 225 during either the second or third step-engagement of the clutch. A black rectangle 358 in lateral alignment with step rectangle 357a and in longitudinal line with the aperture 52c, Figures 10 and 11, will block the aperture 52c and the magnetic clutch latch 190 is released. The detent 225c of accumulator order 204 is thus released while the shaft 198 turns two-tenths of a revolution, thereby making an entry of 2 in the units order 204.

To effect the entry of 8 in the tenths order 205 requires step-entries of 1, 2 and 5 as shown in the above Table I. A black rectangle 359 is therefore provided in lateral alignment with step-rectangles 357 and 357a and in longitudinal line with aperture 52d; and a second rectangle 360 also on said longitudinal line is disposed in lateral alignment with step-rectangle 357c. Passage of these rectangles under aperture 52d operates the release detent of accumulator order 205 in the manner described while step entries of 1, 2 and 5 are made thereby effecting a complete entry of 8 in order 205.

Similarly a black rectangle, which is actually an extension of rectangle 359, is provided to block aperture 52e during the one step engagement and the first of the two step-engagements of the clutch 196, entering steps of 1 and 2 or a complete entry of 3 in the hundredths order 206. At the end of one complete revolution of the shaft 198, Figure 6, the complete entry of 2.83 has thus been made in the accumulator orders 204, 205 and 206 as desired. The foregoing operations may be readily coordinated by reference to the following table:

*Table II*

| 52c | 52d | 52e | Step | 53 | 53a | 53b | 53c | 53d |
|---|---|---|---|---|---|---|---|---|
| Dark | Dark<br>Dark<br>Dark | Dark<br>Dark | 1<br>2<br>2<br>5<br>1 | Dark | Dark | Dark | Dark | Dark |
| 2 | 8 | 3 |  |  |  |  |  |  |

It will be understood from the foregoing that the darkened rectangles or recordings hereinafter referred to as value patterns, may be arranged to intercept the light through the apertures 52 to 52e in any order necessary to enter the digits of any item entry in the accumulator orders of proper denomination. Since the lateral positions of the data recordings with respect to apertures 52 to 52e determine the denominations, these apertures are hereinafter termed denominational apertures. As previously noted, such entries can only occur when the proper classification rectangles or class recordings such as 350, 351 and 352 have darkened the photo-cell 76, by which means improper entries from other classifications in the accumulators of the unit set for a given classification are avoided.

The foregoing explanation sets forth an entry in the positive or clockwise direction of the accumulator orders in Figure 11, this direction representing an addition. When an item entry on the master sheet 81 is to be subtracted, as for example, the item 7.61, Figure 9, the following provision is made:

An elongated darkened recording 361, of an extent equal to or greater than that of the class recordings 353, etc., is disposed in line with the aperture 52f which is thus darkened during the entire passage of the various data and clutch control recordings through the unit. For high speed regulation it is necessary that the subtract recording (such as 361) come into registry slightly in advance of the clutching and digital recordings (such as 357 and 359) in order to provide ample time to allow the magnet 181 to be deenergized and the spring 183a to shift 179 into reversing engagement. It will be noted in Figures 9 and 9a that the subtract recording 361 provides for this. (It will be assumed in the present instance that the slides 59 are adjusted to the classification 35A in which the item 7.61 falls.) As the aperture 52f is blocked, current from the amplifier 332f, Figure 11, energizes the subtract relay coil 336, opening the contact 336b and thereby deenergizing the shifter magnet 181 of the clutch 196. The spring 183a, Figure 6, raises the shifter yoke 180, releasing the dog ring 179 from the gear 176 and placing it in engagement with gear 175. By this means the direction of drive between the clutch sleeve 172 and the shaft 198 is reversed. Entries are then made in the accumulator in the manner already described but in a reverse or negative direction, effecting a subtraction.

CARRY-OVER MECHANISM

As successive additions or subtractions are made in the accumulator, carryovers become necessary, and these are effected in the following manner:

It is assumed that at the end of one complete adding revolution of the shaft 199, Figure 6, that is, just prior to the release of the carryover magnetic latch 193, the accumulator orders 203, 204 and 205 have assumed the positions shown in the enlarged partial diagram, Figure 14. Conductors 334 and 293 being connected by means previously described with branch supply lines 264 and 260, a difference of potential exists between 334 and 293. It is further assumed that in the clockwise rotation of accumulator order 205 it has moved from the 9 position to the zero position, thus requiring carryover to accumulator order 204.

During this movement the cam lobe 227d has momentarily closed the contactor 226d, causing current to flow from conductor 293 via wire 362d, contactor 226d, and wire 363 to the magnet of the relay 347D, thence via wire 364 to the conductor 334. This magnet has thereby been energized closing both contact points 347Dc and 347Da. Closure of 347Dc completes a connection bridging the contactor 226d. Therefore when the lobe 227d completes its movement to the position shown the relay 347D remains closed also as shown. Thereby a circuit may be established from the conductor 293 via contact point 347Da and wire 343c to the release magnet 224c, thence via wires 369c and 366 of relay 450 and wire 366a to the branch supply line 260 when the relay 450 is energized from wire 349d.

The release magnet 224c is thereby energized, releasing and holding the detent 225c disengaged when the magnetic clutch latch 193 is released by the darkening of aperture 52d as previously described. Clutch engages for its final or carryover step of one digit position, and as the accumulator order 204 is not restrained by detent 225c, it is carried forward one digit position to complete the required carryover from accumulator order 205.

In the example shown, the accumulator order 204 is in the nine position prior to the carryover. Therefore, its carryover to zero position necessitates a further carryover into accumulator order 203, which is provided as follows:

While the cam lobe 227c rests in nines position, Figure 14, it holds the second contactor 228c closed. Thereby a circuit is completed from the wire 343c (already connected to supply conductor 293 through the closure of relay 347D as previously described) via wire 367c, contactor 228c, wire 368c and closed contact 242Ca of relay 242C and the wire 343b, to the release magnet 224b of accumulator order 203, thence via wires 369b and 366, relay 450 and wire 366 to the branch supply line 260 when the wire 349d is energized. Thus the magnet 224b is also energized and its detent 225b is held in released position in the same manner as detent 225c as the magnetic latch 193 is energized to effect the carryover movement, and carryover occurs both into accumulator order 204 and 203 as required. Similar means are provided on all accumulator orders so that any number of multiple carryovers are automatically effected as required throughout the series of orders.

The foregoing carryover actions have been described with respect to clockwise motion of the accumulator orders, representing addition. In the case of counter-clockwise motion as in subtraction, closure of contactor 226d is caused by the lobe 227d in passing from the zero to the nine position, the relay contact 241d being closed and locked in the same manner already described to cause energization of the release magnet 224c, thus providing for the first carryover into accumulator order 204. Multiple carryovers in subtraction, however, must obviously be effected from the zero position instead of the nine position, and for this purpose the third contactor 229c is provided.

If the accumulator order 204 stood in zero position the lobe 227c would hold contactor 229c closed. Assuming that subtraction is occurring, the subtract relay 336, Figure 11, is energized, connecting wire 340 via contact 336a to the branch supply line 260. This allows current to flow from wire 340, Figure 14, through a wire 370c to the double throw relay 242C, thence via wire 362c to the conductor 293. Relay 242C is thereby energized, causing a connection to be completed from the wire 343c via wire 367c, contactor 229c, wire 371c, contact point 242Cb and wire 343b to release magnet 224b, thence via wires 369b and 366, relay 450 and wire 366a to the line 260 when wire 349d is energized. Magnet 224b is thus energized to allow the multiple carryover in the same manner as described for addition. Thus the contactors 228c and 229c and their counterparts in the other accumulator orders are cooperative with the cam lobes 227 to effect multiple carryover in addition and subtraction respectively, the relays 242 serving to disable each while the other is in operation, by which means false carryovers are made impossible.

It has been shown in the foregoing description how carryovers are effected from lower to higher orders throughout the series of orders of the accumulator. Referring to Figure 11, it will be noted that the highest accumulator order 201 is provided with a complete set of carryover apparatus identical with that already described for the other orders. The wire 343, adapted to be energized through relay 347 or relay 242 in the manner previously described, is connected via a lead 372 with the release magnet 224e of the lowest accumulator order 206.

By this means, when the total accumulated becomes negative, causing the lobe 227 of accumulator order 201 to move from the zero to the nine position during subtraction, the release magnet 224e is energized while the carry-over latch 193 is released, throwing a negative carryover into the accumulator order 206 and thus providing the so-called "fugitive one." Similarly, as the total again becomes positive, causing accumulator order 201 to move from the nine to the zero position by virtue of the closing of contactor 229, a positive carryover is thrown into accumulator order 206 in the manner described above in positive carryovers.

TOTAL TAKING

For taking totals, the following provision is made:

At the end of a run the total standing in the accumulator is represented by the digits on drums 213, to 218 exposed through the opening or window 51, Figures 2 and 3, the total if positive being represented by the digits on the near side of partition 249 in Figure 3, and if negative, by the nines-complementary digits on the far side of the partition. Thus, the positive total digits are exposed to the flash lamp 255 on the near side of the partition 249 (Figure 3) and the true negative total digits to lamp 254 on the opposite or far side of partition 249. It is evident that if lamp 255 be illuminated, an image of the positive total digits will be projected on the film 138 via mirror 250, lens 253, mirror 252 and mirror 251. The totals on the drums appear upside down and in reverse order in Figure 3, but due to the reversing action of the three angular mirrors and lens, the image appears upright and in proper order on the film 138. If desired, a symbol such as the letter C, designated by the numeral 373, indicating a negative total or credit balance, may be imprinted on the bottom of the chamber 49 as shown in Figure 3. When the negative total is photographed, the symbol C is also photographed to indicate the nature of the total.

The means by which the lamps 254 and 255 are actuated are as follows:

Lamp 255, Figure 11, is connected by wires 374, 375 and 376 to a suitable rectifier system shown in Figure 11a, generally denoted by the numeral 377 and adapted to be actuated by a relay 378. As the rectifier system 377 is identical in structure and function with that already shown and described with respect to the flash lamp 163, no further explanation of it is necessary herein. A similar rectifier system 379, controllable by a relay 380 is connected to the lamp 254 by wires 381, 382 and 383.

The magnet of relay 378, Figure 11a, is connected on one side via a wire 384 to one point 385 of a double-throw switch 386, Figure 11, the arms of switch 386 being connected via a wire 387 to the main supply line 108. The magnet of relay 380 is connected on one side via a wire 388 to the other point 389 of switch 386. The other sides of the magnets of relays 378 and 380 are both connected to a wire 390 which is in turn connected as shown in Figure 11, to a movable contact arm 391 of a switch 391a, the arm 391 being adapted to be engaged by a second contact arm 392; these arms are also shown in enlarged diagrammatic detail in Figure 12.

Referring to Figure 11, upon engagement of the contact arms 391 and 392 by depression of a plunger 392a, current is directed from line 264 via arms 391 and 392 and the wire 390 to the magnet of relay 378, Figure 11a, thence back through wire 384, switch point 385, Figure 11, and wire 387 to the main supply line 108. By this means, the relay 378 is closed, directing the energy of rectifier 377 through the flash lamp 255 to photograph the positive total.

The switch 386, Figure 11, is provided with shifting means comprising a toggle arm 393 adapted to be swung to the left as shown by a magnet 394 or to the right by a similar magnet 395. The magnet 394 is connected on one side to the conductor 334 and on the other to one contact point 396 of a second double-throw switch 397 also operable by the toggle arm 393. The magnet 395 is connected on one side to the conductor 340 and on the other side to the second contact point 398 of the second switch 397. The movable members of the switch 397 are connected to the wire 372 which, as previously explained, is adapted to be energized through the carryover mechanism of the highest accumulator order 201. The position shown in Figure 11 is the normal position of the toggle arm 393 and its related switches, in which position closure of the total taking switch actuates the flash lamp 255 to record the positive total as described above. In case the total becomes negative during subtraction, causing the carryover mechanism of accumulator order 201 to energize the wire 343 as set forth previously, current passes from 343 via wire 372 and the switch point 398 to the magnet 395, thence through wire 340 and contact 336a of the subtract relay 336 to the branch supply line 260. Magnet 395 is energized, moving the toggle arm 393 in a clockwise direction. The switch 386 is thereby thrown to the right, closing the contact 389. At the same time the switch 397 is thrown to the left, connecting point 396 to the wire 372.

So long as the total remains negative the toggle arm 393 and its related switches remain in the position just described. If during this time the total taking switch 391a is operated, the current directed thereby through the wire 390 passes to the magnet of relay 380, Figure 11a, thence through wire 388, contact point 389 of switch 386, and wire 387 to the main supply line 108. The relay 380 is energized, throwing the energy of rectifier 379 through the flash lamp 254 to illuminate the nines complementary digits exposed in window 51, Figure 3, thereby recording the true negative total on the film 138.

As soon as there is a positive movement of the accumulator order 201 from the nine to the zero position, either by the total becoming positive or in clearing the accumulator as hereinafter explained, the wire 343 is again energized, current passing from it through wire 372 and contact point 396 to magnet 394, thence through wire 334 to the branch supply line 260. Magnet 394 is energized, restoring the arm 393 and switches 386 and 387 to normal or positive total taking position as shown.

CLEARING THE ACCUMULATOR

Referring to Figures 11 and 12, it will be noted that the switch 391a has a third arm 399 adapted to make momentary wiping contact with a contact point 400 when depressed by the arm 391. The arm 399 is connected to the branch supply line 264, while the point 400 is connected to the wire 349d leading to the magnetic clutch latch 193. A four pole contactor 401 is adapted when closed to complete connections from the line 264 to the four remaining magnet clutch latches 189, 190, 191 and 192. The contactor 401 is operable by a bar 402 adapted to be depressed by arm 399 after the latter has broken contact with the point 400. Contactors 403, 403a, 403b, 403c, 403d and 403e, operable conjointly with arm 392, are adapted to make connections between the conductor 293 and the wires 404 to 404e respectively connecting the accumulator order release magnets 223, 223a, 223b, 223c, 223d, 223e, to their amplifiers 332, 332a, 332b, 332c, 332d and 332e. Another contactor 405, also operable conjointly with arm 392, is provided to complete a circuit from line 264 to conductor 293 bridging the normally open contact 316d of relay 316, Figure 11a. This bridging contactor 405 is necessary to allow a circuit through wire 293 for carrying out the total taking and clearing operations, since the contact 316d, Figure 11a is closed only during listing and adding, as previously set forth.

It will be understood that structurally the contactors 403 to 403e and 405 are preferably combined with arm 392 as a gang switch, but they are represented herein as separated (and conventionally joined by dot-dash lines) to avoid undue congestion and complication of the circuit diagram.

In a complete total taking and accumulator clearing operation, the various actions take place as follows as the plunger 392a is depressed:

Contactors 403 to 403e, and contactor 405 are closed, passing current from branch supply line 264 to 293 and through release magnets 223 to 223e, thence via conductor 334 to the branch supply line 260. All accumulator order detents are thereby released and held disengaged. At the same time the arm 392 engages arm 391, completing the circuit for causing the total to be recorded as previously described. The contact of arm 392 with arm 391 also allows current to energize the clearing magnet 245 which is connected between wire 390 and the line 260, Figure 11. Magnet 245 being magnetized, rocks the shaft 243, Figures 6, 7 and 7a, bringing the hooks 247 into position to intercept the pins 248.

Continued downward movement of the plunger 392a swings the arm 399 downward past the contact point 400, making and immediately breaking a wiping contact with the latter. The momentary contact causes a momentary energization of the magnetic latch 193, but this is immaterial at this time, as the clutch detent tail 188a, Figure 8, is in starting position in engagement with armature 194 of latch 189.

After breaking the above contact with point 400 the arm 399 engages the bar 402 and presses the latter downwardly, closing all contacts of the four-pole switch 401, and completing circuits between lines 260 and 264 through magnetic clutch release latches 189, 190, 191 and 192. These latches are thereby all disengaged, allowing the clutch to engage and revolve through ten-elevenths of a revolution until disengaged and stopped by armature 194d of latch 193. This ten-elevenths of a revolution imparts a full revolution to the shaft 198, Figures 6 and 7, and as the accumulator order latches are all released, all accumulator orders are rotated until the various pins 248 are stopped and held by the hooks 247 in the zero positions, thus clearing the accumulator.

As the plunger 392a is released, the four-pole switch 401 is first opened, de-energizing the latches 189, 190, 191 and 192 and allowing their armatures to snap into holding positions as shown in Figure 8. Thereafter, the arm 399 again wipes across the contact point 400 (in a direction opposite to the first wiping above described) causing magnetic latch 193 to be again energized. Armature 194d, which had been holding the clutch disengaged, allows the latter to engage and complete the last eleventh of its revolution, when it is again released and held in starting position by armature 194 of latch 189 as shown in Figure 8.

Further continued upward movement of the plunger 392a allows all the remaining associated switches to open and thus returns the machine to normal or starting position throughout.

Depression of the plunger 392a for total taking and clearing the accumulator as described above may be accomplished manually or automatically in several ways. One example is by the means shown in Figure 12, in which the numeral 406 designates a solenoid surrounding the plunger 392a and adapted when energized to draw the latter downward and thus operate the associated switches as set forth. The solenoid 406 has one terminal connected to the supply conductor 108 and its other terminal through a toggle switch 408 and a manually closable switch 407 and thence to the wire 99 leading to the brush 97. The solenoid is thus in parallel with the magnets 101 and 115. Therefore, when the brush 97 encounters the hub 92 to energize the magnets 101 and 429 as previously described, the solenoid 406 is also energized to draw the plunger 392a downward. At the bottom of its stroke the head of the plunger opens the toggle switch 408, de-energizing the solenoid and allowing the plunger to be returned upward by the return springs of its associated switches. The toggle switch 408 has a return magnet 409 connected in parallel with the magnetic clutch 90, so that when the latter is energized in starting a run the magnet 409 also is energized to reset the toggle switch 408.

If automatic total taking is not required, the manual switch 407 is opened to disable the circuit of the solenoid 406. The plunger 392a may then be depressed by hand if desired.

It will be understood that since a complete set of total taking apparatus as described is associated with each of the two classifying sections 34 and 35, there are two solenoids 406 and two toggle switches 408, but as the two sets are identical in structure, connections and functions, only one need be described herein.

A manually operable switch 410 may be provided in the branch supply line 260, Figure 11. By opening this switch the adding mechanism may be disabled in case it is desired merely to list selected items without adding.

To summarize briefly a typical set of operations of the machine, the procedure and order of events is as follows:

The operator first opens the top of the machine by raising the hinged panel 32 together with the casings 34 and 35, threads the master strip or record 81 in place on the reels 91 and 92, then recloses the casing. Loaded magazines 129 and 130 are then inserted through the front of the casing and locked in place by means of knobs 135.

The slides 61 and 356 of classifying sections 34 and 35 are adjusted to the desired classifications, and their individual supply switches 262 and 261 are closed. Assuming that computation is to be carried out in both classifications, the switches 410 are allowed to remain closed. The manual stop switch 256 is then closed.

The operator depresses and momentarily closes the title switch 127. Through the connections described and shown in Figures 12, 11a, and 11, the flash lamps 72 in chambers 43 are illuminated, causing images of the exposed classification indicia such as 36b, Figure 3, to be projected via mirror 70, lens 69 and mirror 71 to the films 138 through window 48, thus photographing these indicia on the film. To compensate for the reversing action of the lens 69 in the lateral plane, the indicia 36b are imprinted in inverted position as shown in Figure 3.

The operator next depresses the starting switch 118, causing the master strip or record 81 to be drawn completely through the machine in the forward direction, then automatically returned to start position as described in connection with Figure 12. As each item of a classification for which either section is set passes through that section, its class recordings (such as 350, 351 and 352, Figure 10) darken the underlying photocell and actuate the flash lamp 163, recording the image of the entry on the films 138. At the same time the step recordings 357 to 357d successively darken the underlying cathodes of multiple photocell 77, causing the clutch to perform its rotation in successive steps having the relation of 1, 2, 2, 5 and 1; meanwhile the selector recordings such as 358 to 360, by control of the detents of the various accumulator orders, allow the proper combinations of rotative steps to be produced in the accumulator orders to effect the entry of the classified item, including carryovers whenever necessary. If the item entry is to be negative, a subtract recording 361, by darkening the aperture 52f, causes the item to be subtracted in the accumulator.

At the end of the run the solenoids 406 depress the plungers 392a, automatically recording the true totals, either positive or negative, of both classifications on the films 138 and the machine is ready for the next run. The operator may then readjust the slides 59 and 356 to other classifications, again press the start switch to start a new cycle, and continue the operation throughout as many classifications as it is desired to assemble from the master record. Since all the listing and computing operations for each item entry take place by photoelectric control during the passage of that item through its classifying section, it is evident that these operations are accomplished in the minimum of time. It is further evident that the device eliminates any pre-sorting operations such as are necessary with card controlled tabulators and the like.

It is well known to those skilled in the art that photoelectric control circuits such as those shown herein may be adjusted to operate by a change in illumination of the photocell in either direction. For example, either by a decrease or an increase of illumination. For this reason, it is obvious that in carrying out the described method the various control recordings need not necessarily be black rectangles as shown herein by way of example, but may also be any type of recordings which will effect a given change in the record's impedance to the passage of light or radiant energy. In other words, these recordings may be black, white, any intermediate shade or color or even perforations, the only requirement being that they effect such contrast in light impedance with the body of the record as is required by the particular adjustments of the photoelectric circuits.

Since the actuating connection from the control apparatus to the computing units 164 and 165 is entirely electrical, it is evident that if desired for purposes of transfer or the like, the computing units, together with their motor, may be disposed in locations remote from the control units in cases where it is not required to photograph the totals on the same film as the classified lists. It is also obvious, as previously noted, that for such purposes each computing unit may be provided with an individual motor instead of operating two or more units from the single motor 171.

While the invention has been described in preferred form, it is not limited to the exact procedures, structures and circuits shown and described herein, as various modifications may be made without departure from the scope of the appended claims.

What is claimed is:

1. In a record controlled accounting machine, an accumulator wheel, mechanism including a shaft frictionally connected to said wheel and electrically controlled instrumentalities for causing said shaft to move in a series of angular steps having ratios of one, two, two and five, magnetically controlled restraining means holding said accumulator wheel against movement and adapted, when retracted, to permit said accumulator to rotate under the frictional urge of said shaft, and means including an exciting lamp and photoelectric means for translating indicia on said record into electrical impulses for controlling the said rotation of said shaft and for controlling the retraction of said restraining means in unison with at least one of said steps to effect entries in said accumulator wheel.

2. In an accounting machine, a shaft and means to drive the same, a second shaft, an accumulator including a plurality of ordinal elements frictionally connected to said second shaft, electrically controlled devices angularly disposed about said first shaft for controlling the association of said second shaft with and the dis-association of said second shaft from said first shaft for rotating said second shaft angular distances or increments, an electrically controlled release normally engaging the lowest ordinal element in said accumulator against rotation, means for selectively energizing said release in time with one or more of said increments, other electrically controlled releases associated with the others of said ordinal elements each being under control of its preceding order in said accumulator for effecting carry-overs from each order to the next adjacent order, and electrically controlled means associated with the lowest order in said accumulator and controlled by the highest order of said accumulator when the latter is passing from the "9" to the "0" position to cause said lowest order to advance one numerical position, thereby taking care of the "fugitive one."

3. In a machine controlled by records carrying codes comprising combinations of light modifying representations corresponding to amounts and other light modifying representations in definite relation to said first representations for effecting control of said machine, a sensing means including an exciting lamp and photo-electric means for reading said record, a drive shaft, an entry receiving device including a plurality of accumulator ordinal elements, a second shaft frictionally connected to said elements, electrically controlled mechanism associated with said last shaft for insuring the movement of the same in steps under control of said second representations, restraining means normally holding said ordinal elements against rotation, and electro-magnetic means under control of said first representations for releasing said restraining means.

4. The invention according to claim 3 in which the record may also carry subtract representations and in which said machine includes reversing means for said second shaft, and electrical control means for said reversing means under control of said sensing means whereby the presence of a "subtract" representation among said second representations in line with said first representations effects the actuation of said electrical control means causing the reversal of said shaft and the entry receiving device and thereby an entry is subtracted instead of added.

5. In an accounting machine, in combination, an accumulator mechanism including a normally rotating shaft and a normally stationary shaft, a plurality of numerical wheels of successive orders in rotary frictional connection with said second shaft, means to clutch said first shaft to said second shaft, electrically operable means to control said clutching means whereby said second shaft may be rotated through a series of predetermined angular steps, means to normally restrain each of said wheels from rotation, and electrically operable means for each of said restraining means to selectively retract said restraining means during a predetermined number of said steps thereby effecting the differential rotation of said numerical wheels and entering values represented by said predetermined number of steps.

6. In an accounting machine, in combination, an accumulator mechanism including a normally rotatable shaft and a normally stationary shaft, a plurality of numerical wheels of successive orders in rotary frictional connection with said second shaft, a plurality of devices angularly disposed about said first shaft for controlling the clutching of said second shaft to and the declutching of the same from said first shaft, electrical controls for each of said devices whereby said second shaft may be rotated through a series of angular steps, means to normally restrain each of said wheels from rotation, an electrically operable means for each of said restraining means to selectively retract said restraining means during a predetermined number of steps thereby effecting the differential rotation of said numerical wheels and entering values represented by said predetermined number of steps.

7. In an accounting device, in combination, a normally stationary member, a normally rotating shaft in said member, means to intermittently clutch said member to said shaft, whereby said member may be rotated through one complete revolution by angular increments having the relation of 1, 2, 2, 5, and 1, a second shaft, means gearing said second shaft to said member in the ratio of ten to eleven whereby said second shaft may be rotated incrementally through one and one-tenth revolutions by said complete revolution of said member, a plurality of accumulator ordinal elements associated with said second shaft, means to selectively impart the rotational increments of said second shaft to said wheels, and means acting in time with said last increment of 1 for effecting carry-overs from one order to the next.

8. The invention according to claim 7 in which said means to impart rotatively increments of said second shaft to said ordinal elements includes; means effecting a frictional urge between said second shaft and each of said ordinal elements, individual latching means normally engaging said elements, individual releasing means for said latching means, and means for selectively unlatching at least one of said latching means in time with one or more of said rotational increments.

9. Apparatus constructed and arranged to be controlled by a record member having a record consisting of a plurality of elements comprising in combination a master movable member, means responsive to certain of said record elements for moving said master member progressively forward in a series of successive, definite steps comprising one step of unit length and a plurality of steps whose lengths are different multiples thereof, a plurality of other movable members, means responsive to the movement of said master member for moving all of said other members in a like series of steps and separate means each reponsive to certain other of said record elements for limiting the movement of each one of said other movable members to certain particular steps.

10. Accounting apparatus constructed and arranged to be controlled by indicia elements on a record strip comprising in combination means for moving said strip through said apparatus, a master rotatable member, means responsive to certain of said indicia elements for rotating said master member in a series of steps including one of unit length and a plurality whose lengths are different multiples thereof, a plurality of rotatable accumulator members, means responsive to the movement of said master member for rotating all of said accumulator members simultaneously in a like series of steps, and a plurality of separate means each operative in response to certain other of said indicia elements to limit the rotation of a particular accumulator member to certain particular steps.

11. Apparatus constructed and arranged to be controlled by a controlling member comprising in combination a first movable member, means for moving said first member progressively forward in a series of successive, definite steps comprising one step of unit length and a plurality of steps whose lengths are different multiples thereof, a second movable member, means controlled by said first member for moving said second member in a corresponding series of steps, and means responsive to said controlling member for limiting the movement of said second member to certain particular steps as determined by said controlling member.

12. Apparatus constructed and arranged to be controlled by a controlling member comprising in combination a first movable member, means controlled by said controlling member for moving said first member progressively forward in a series of sucessive definite steps comprising one step of unit length and a plurality of steps whose lengths are different multiples thereof, a second movable member, means controlled by said first member for moving said second member in a corresponding series of steps and means controlled by said controlling member for limiting the movement of said second member to certain particular steps of its movement as determined by said controlling member.

13. Apparatus constructed and arranged to be controlled by a controlling member comprising in combination a first movable member, means for moving said first member progressively forward in a series of successive, definite steps comprising one step of unit length and a plurality of steps whose lengths are different multiples thereof, a second movable member, means controlled by said first member for moving said second member in selected steps corresponding with the steps of said series, and means by which said controlling member effects a selection of the desired steps of movement of said second movable member.

14. Apparatus constructed and arranged to be controlled by a record strip having thereon a plurality of controlling indicia, a first rotatable member, means controlled by certain of said indicia for rotating said first member progressively forward in a series of successive, definite steps comprising one step of unit length and a plurality of steps whose lengths are different multiples thereof, a second rotatable member, means responsive to the movement of said first member for moving said second member in selected steps of various lengths corresponding with certain steps of said series, and means by which other of said controlling indicia effect a selection of the particular steps of movement which said second rotatable member is desired to have.

15. Accounting apparatus constructed and arranged to be controlled by a member having thereon indicia consisting of step-controlling elements and a plurality of groups of step-selecting elements comprising a master rotatable member, a plurality of accumulator wheels, means responsive to said step-controlling member for rotating said master member progressively forward through a fixed distance in a series of successive definite steps including one step of unitary length and a plurality of steps whose lengths are multiples thereof, means responsive to the movement of said master member for rotating all of said accumulator wheels in a like series of steps and separate means each responsive to one of said groups of step-selecting elements for limiting the movement of each of said accumulator wheels to certain of said steps.

16. An accounting apparatus adapted for control from a movable record, comprising record sensing means, a master member, means for moving said member in a predetermined path, separate releasable devices interposed in said path and arranged sequentially at differently spaced intervals for initiating and limiting each step of movement of said member, means controlled by said sensing means for releasing said devices successively by sequentially arranged indicia upon the record, a plurality of normally restrained accumulator wheels coordinated with said member for individual movement corresponding to any step and means controlled by the sensing means for releasing any of said wheels by other indicia during any step of movement of said member.

CHARLES J. GOODALE.